United States Patent [19]

Malecek et al.

[11] Patent Number: 5,611,392
[45] Date of Patent: Mar. 18, 1997

[54] POWER FLUID HEATING SYSTEM

[75] Inventors: Edward L. Malecek, Delano; Charles H. Ramberg, Dayton, both of Minn.

[73] Assignee: Arctic Fox Heaters, Inc., Delano, Minn.

[21] Appl. No.: 12,278

[22] Filed: Feb. 1, 1993

Related U.S. Application Data

[63] Continuation-in-part of Ser. No. 846,752, Mar. 4, 1992, abandoned, and a continuation of Ser. No. 666,233, Mar. 8, 1991, abandoned.

[51] Int. Cl.$^6$ ..................................................... F02M 31/00
[52] U.S. Cl. ........................... 165/47; 165/132; 123/557; 123/546; 123/514; 123/142.5 R; 210/187; 429/62
[58] Field of Search ..................................... 123/557, 546, 123/514, 142.5 R; 165/132, 47, 51; 210/187

[56] References Cited

U.S. PATENT DOCUMENTS

| | | |
|---|---|---|
| 2,641,451 | 6/1953 | Kaiser . |
| 3,110,633 | 11/1963 | Bachmann . |
| 4,343,283 | 8/1982 | Shepard ................... 123/557 |
| 4,512,324 | 4/1985 | Neary . |
| 4,534,408 | 8/1985 | Thibonnet ................. 123/557 |
| 4,553,697 | 11/1985 | Nothen et al. . |
| 4,656,979 | 4/1987 | Hogenson ................. 123/557 |
| 4,664,088 | 5/1987 | Cantoni ................... 123/557 |
| 4,748,960 | 6/1988 | Wolf . |
| 4,933,077 | 6/1990 | Wolf . |
| 4,933,093 | 6/1990 | Kella ...................... 123/557 |
| 4,964,376 | 11/1990 | Veach et al. . |
| 5,005,551 | 4/1991 | McNelley ................. 123/557 |
| 5,029,634 | 7/1991 | Humer . |
| 5,135,044 | 8/1992 | Humer . |

FOREIGN PATENT DOCUMENTS

| | | | |
|---|---|---|---|
| 0069639 | 1/1983 | European Pat. Off. ............... 123/557 |
| 0355246 | 2/1990 | European Pat. Off. ............... 123/557 |
| 2549148 | 1/1985 | France .................... 123/557 |
| 0730960 | 1/1943 | Germany ................... 123/557 |
| 3241065 | 5/1984 | Germany ................... 123/557 |

OTHER PUBLICATIONS

Testing of Latent Heat Storage Battery Box System, Environmental Chamber, National Research of Canada, Ottawa, Ontario, Canada (Aug. 24–28, 1992).

Advancing the Science of "School Bus Heating" product literature from Webasto Heater, Inc., Madison Hts., MI (date unknown).

*Primary Examiner*—John K. Ford
*Attorney, Agent, or Firm*—Patterson & Keough, P.A.

[57] ABSTRACT

A power fluid heating system according to this invention includes a heating apparatus positioned within a power fluid container having a first power fluid pickup conduit, a second power fluid pickup conduit positioned within the first power fluid pickup conduit, and a heat exchanger for directly heating both the power fluid in the container and the power fluid in the first and second pickup conduits. The power fluid heating system also includes a water separating device. The water separating device includes a power fluid reservoir and a heat exchanger inside the reservoir. The power fluid heating system also includes a heat exchanger having heat exchange fluid medium passages for the flow of a heatable fluid through the passages so that the heated power fluid exiting the water separating device provides heat transfer to the heatable fluid. The heatable fluid then provides heat exchange to the power fluid container which stores the power fluid by passage of the heatable fluid through the heating apparatus heat exchanger.

54 Claims, 15 Drawing Sheets

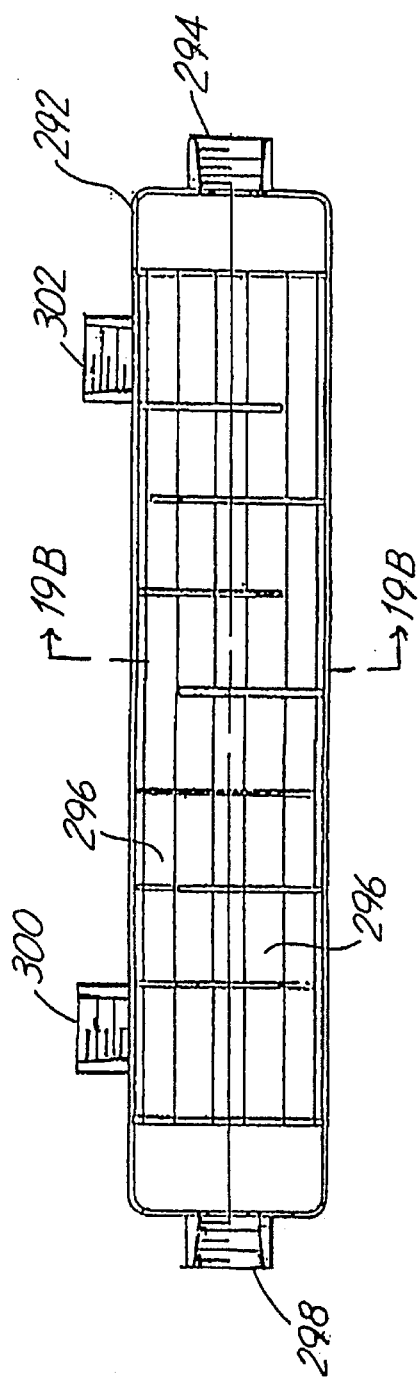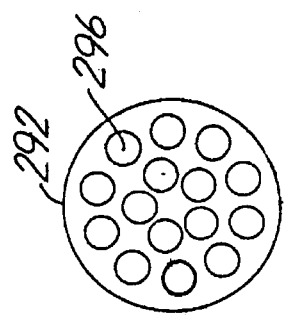
Fig. 19A
Fig. 19B

POWER FLUID HEATING SYSTEM

RELATED APPLICATIONS

This application is a continuation-in-part of U.S. patent application Ser. No. 07/846,752, filed Mar. 4, 1992 and now abandoned, and a continuation of U.S. patent application Ser. No. 07/666,233, filed on Mar. 8, 1991 and now abandoned.

FIELD OF THE INVENTION

The present invention relates generally to fuel systems. In particular, the invention relates to a system for heating and controlling the temperature of a power fluid in a fuel system, such as diesel fuel and hydraulic oil.

BACKGROUND OF THE INVENTION

Whenever the fuel tank or the fuel line of an engine is exposed to cold weather, the fuel or certain impurities or additives contained in the fuel may gel or "wax". The viscosity of the fuel, additives, or impurities increases to such a degree that the fuel no longer flows well through the fuel systems. For example, the diesel fuel in the fuel tanks or fuel lines of diesel trucks may wax if the truck is parked or driven in extremely cold weather. Since waxing can interfere with the proper flow of fuel to the engine, it frequently results in poor engine performance. Severe waxing may even block the flow of fuel entirely, stalling the engine.

Similar cold weather problems exist with the use of hydraulic oil. Typically hydraulic oils of various grades experience viscosity changes dependent on temperature. In cold weather or winter months, hydraulic oil which is cold provides slower response times to the equipment it is powering. It is often necessary to warm the hydraulic oil reservoir prior to powered operation of equipment to avoid improper operation.

Problems also exists when diesel fuel or hydraulic oil is warmer than an optimum operating range. In the case of diesel fuel, optimal operating temperatures may range generally between about 60° F. and about 110° F. subject to the quality of the diesel fuel, additives therein, and other considerations. Frequently, diesel fuel in trucks and vehicles operating in warmer climates or for long durations produce heating effects within the engines that cause the fuel temperature to exceed the optimum power ranges. This overheating may result in numerous problems, including damage to electronic components in engine systems. Therefore, it is desirable to reduce the amount of heat in the fuel in such situations. Similarly, when hydraulic oil is warmed beyond an optimum range, power control problems and residual heating effects may occur. It is, therefore, desirable to reduce the amount of heat in hydraulic oil reservoirs when the temperature of such reservoir exceeds a predetermined range, but at the same time be able to provide good heat rise to such fluids as warranted.

In addition, fuel frequently becomes contaminated with water. Sometimes water contaminants are already present in fuel when the fuel is added to the fuel tank. Improper handling or poor refining may introduce water contaminants to fuel. Moreover, water condensation inside a fuel tank sometimes takes place following outside air intrusion into the fuel tank. At low temperatures, water contamination can take the form of ice crystals suspended in the fuel. Fuel contaminated with water or ice crystals also causes poor engine performance or stalling.

Cold weather operation of vehicles and other equipment is also adversely affected by the loss of power in a battery used for providing startup power to the system. This is a particularly debilitating problem in severe cold weather or very low temperature wind chill environments during extended vehicle shut off periods, such as overnight shut downs.

Numerous methods and apparatus have been used in the past in an attempt to solve these or related problems. Waxing and system thermal loss may be eliminated by heating the fuel and related components. Also, heating the fuel melts ice crystals and tends to cause water contaminants to precipitate from the fuel. Although heating fuel may eliminate waxing or icing, the water, in liquid form, may collect within the fuel system, for example, inside the fuel tank or inside a fuel filter disposed downstream from the fuel tank.

There have been many proposed devices for heating fuel to eliminate waxing and icing, to precipitate the water, and to purge water from the fuel system. Many such devices employ tubes which circulate a heatable fluid, for example, a fluid bearing waste heat, such as engine coolant, motor oil, or exhaust gas, through a reservoir of fuel. Typically, the fuel is then heated via a heat exchange process, as shown for example, in U.S. Pat. No. 4,553,697 issued to Nothen, U.S. Pat. No. 2,641,451 issued to Kaiser, and U.S. Pat. No. 4,964,376 issued to Veach et al. However, it frequently requires a considerable period of time for the coolant or exhaust gas to become hot and for the hot coolant or exhaust gas to sufficiently heat the fuel and other system components. Consequently, the engine may nonetheless perform poorly for a long period of time, and might even subsequently shut down unexpectedly.

Further, while much of the fuel is eventually heated by such a device, localized cold spots may still develop. For example, in the extremely cold weather, the fuel may continue to wax along the bottom and sides of large metal fuel tanks. Since the inlet of the fuel line is typically located near the bottom of the fuel tank, such localized waxing along the bottom of the tank may interfere with the proper flow of fuel through the fuel line. In similar manner, oil drain pans experience related cooling due to their normal location beneath engines.

SUMMARY OF THE INVENTION

A power fluid heating system for power fluid entering an engine, which has a container for storing the power fluid, is provided. The power fluid heating system includes at least one heating apparatus which has a power fluid pickup conduit insertable into the container and heat exchanger means for directly heating both the power fluid in the container and in the pickup conduit. The heating apparatus heat exchanger means includes a heat conductive portion which is inserted into the container in contact with the power fluid in the container and which surrounds a portion of the power fluid pickup conduit. The heat conductive portion may contain a heatable fluid. The power fluid heating system also includes a water separating device. The water separating device includes a power fluid reservoir and a heat exchanger inside the reservoir. The heat exchanger within the water separating device includes at least one tube and an enclosure around at least a portion of the tube to define a pre-heat chamber. The power fluid heating system also includes a heat exchanger means having heat exchange fluid medium passages for the flow of a heatable fluid through the passages so that the heated power fluid exiting the water separating device provides heat transfer to the heatable fluid. The heatable fluid then provides heat exchange to the container which stores the power fluid by passage of the heatable fluid through the heating apparatus heat exchanger means.

A power fluid heating system for power fluid entering an engine having a reservoir tank for storing the power fluid is also provided which includes a bypass device to control the heating of the power fluid. The bypass device includes a heat exchanger means comprising a casing with an elongate heat conductive external shell which is inserted into the reservoir tank through a power fluid sending gauge opening. The heat exchanger means also includes an inlet and an outlet for admitting a heatable fluid into the casing. The bypass device also includes a power fluid intake conduit which extends through the casing. A manifold means is also included in the bypass device to control fluid flow through the bypass device. The manifold means is connected to the bypass device heat exchanger means and the power fluid intake conduit, and is constructed and arranged to provide fluid flow paths for a heatable fluid and power fluid entering and exiting the manifold means. The bypass device also includes bypass means within the manifold means for selectively admitting flow of heatable fluid. The power fluid heating system also includes a water separating device. The water separating device includes a power fluid reservoir and a heat exchanger inside the reservoir. The heat exchanger within the water separating device includes at least one tube and an enclosure around at least a portion of the tube to define a pre-heat chamber. The power fluid heating system also includes a heat exchanger means having heat exchange fluid medium passages for the flow of a heatable fluid through the passages so that the heated power fluid exiting the water separating device provides heat transfer to the heatable fluid. The heatable fluid then provides heat exchange to the reservoir tank which stores the power fluid by passage of the heatable fluid through the heating apparatus heat exchanger means.

Another power fluid heating system according to this invention includes a heating apparatus positioned within a container having a first power fluid pickup conduit, a second power fluid pickup conduit positioned within the first power fluid pickup conduit, and a heat exchanger means for directly heating both the power fluid in the container and the power fluid in the first and second pickup conduits. The power fluid heating system also includes a water separating device. The water separating device includes a power fluid reservoir and a heat exchanger inside the reservoir. The heat exchanger within the water separating device includes at least one tube and an enclosure around at least a portion of the tube to define a pre-heat chamber. The power fluid heating system also includes a heat exchanger means having heat exchange fluid medium passages for the flow of a heatable fluid through the passages so that the heated power fluid exiting the water separating device provides heat transfer to the heatable fluid. The heatable fluid then provides heat exchange to the container which stores the power fluid by passage of the heatable fluid through the heating apparatus heat exchanger means.

Another power fluid heating system according to this invention includes a heating apparatus positioned within a container having a first power fluid pickup conduit, a second power fluid pickup conduit positioned within the first power fluid pickup conduit, and a heat exchanger means for directly heating both the power fluid in the container and the power fluid in the first and second pickup conduits. The power fluid heating system also includes a heat exchanger means having heat exchange fluid medium passages for the flow of a heatable fluid through the passages so that the heated power fluid exiting the water separating device provides heat transfer to the heatable fluid. The heatable fluid then provides heat exchange to the container which stores the power fluid by passage of the heatable fluid through the heating apparatus heat exchanger means.

Another fluid heating system according to this invention includes a heating apparatus positioned in a reservoir tank having a first fluid pickup conduit, a second fluid pickup conduit positioned within the first fluid pickup conduit, and a heat exchanger means for directly heating both the fluid in the reservoir tank and the fluid in the first and second pickup conduits. The fluid heating system also includes a heat exchanger means having heat exchange fluid medium passages for the flow of a heatable fluid through the passages so that the heated fluid exiting the water separating device provides heat transfer to the heatable fluid. The heatable fluid then provides heat exchange to the reservoir tank which stores the fluid by passage of the heatable fluid through the heating apparatus heat exchanger means.

A further fuel heating system for fuel entering an engine which has a container for storing the fuel is provided. The fuel heating system includes means for heating the fuel stored in the container which has a fuel pickup conduit insertable into the container and heat exchanger means for directly heating both the fuel in the container and in the pickup conduit. The heat exchanger means includes heat conductive portion which is inserted into the container in contact with the fuel in the container and which surrounds a portion of the fuel pickup conduit. The heat conductive portion may contain a heatable fluid. The fuel system also includes a water separating device. The water separating device includes a fuel reservoir and a heat exchanger inside the reservoir. The heat exchanger within the water separating device includes at least one tube and an enclosure around at least a portion of the tube to define a pre-heat chamber. The fuel heating system also includes a heat exchanger means having heat exchange fluid medium passages for the flow of a heatable fluid through the passages so that the heated fuel exiting the water separating device provides heat transfer to the heatable fluid. The heatable fluid then provides heat exchange to the container which stores the fuel by passage of the heatable fluid through the heating apparatus heat exchanger means.

BRIEF DESCRIPTION OF THE DRAWINGS

FIG. 19a is a side sectional view of the heat exchanger shown in FIG. 18.

FIG. 19b is a cross sectional view of the heat exchanger along line 19b—19b in FIG. 19.

DETAILED DESCRIPTION OF THE INVENTION

The invention relates to a power fluid heating system for power fluid entering an engine system, and to overall heating of system components in a power equipment system. Generally, the power fluid, such as diesel fuel, hydraulic fluid, gasoline, or petrol, is stored in a reservoir tank. The fuel is drawn out of the tank and is passed through a heating apparatus. A fuel preheater/water separating device heats the fuel and directs the fuel to a coolant heater to further warm the fuel and heat a heatable fluid, such as engine coolant. Engine coolant is also circulated through the system to warm the fuel by heat exchange. The warmed fuel is directed through heating apparatus 22 and water separator 24 for additional heating, and is then fed to the engine to start the engine 28 of the truck or other vehicle.

Figure 1:
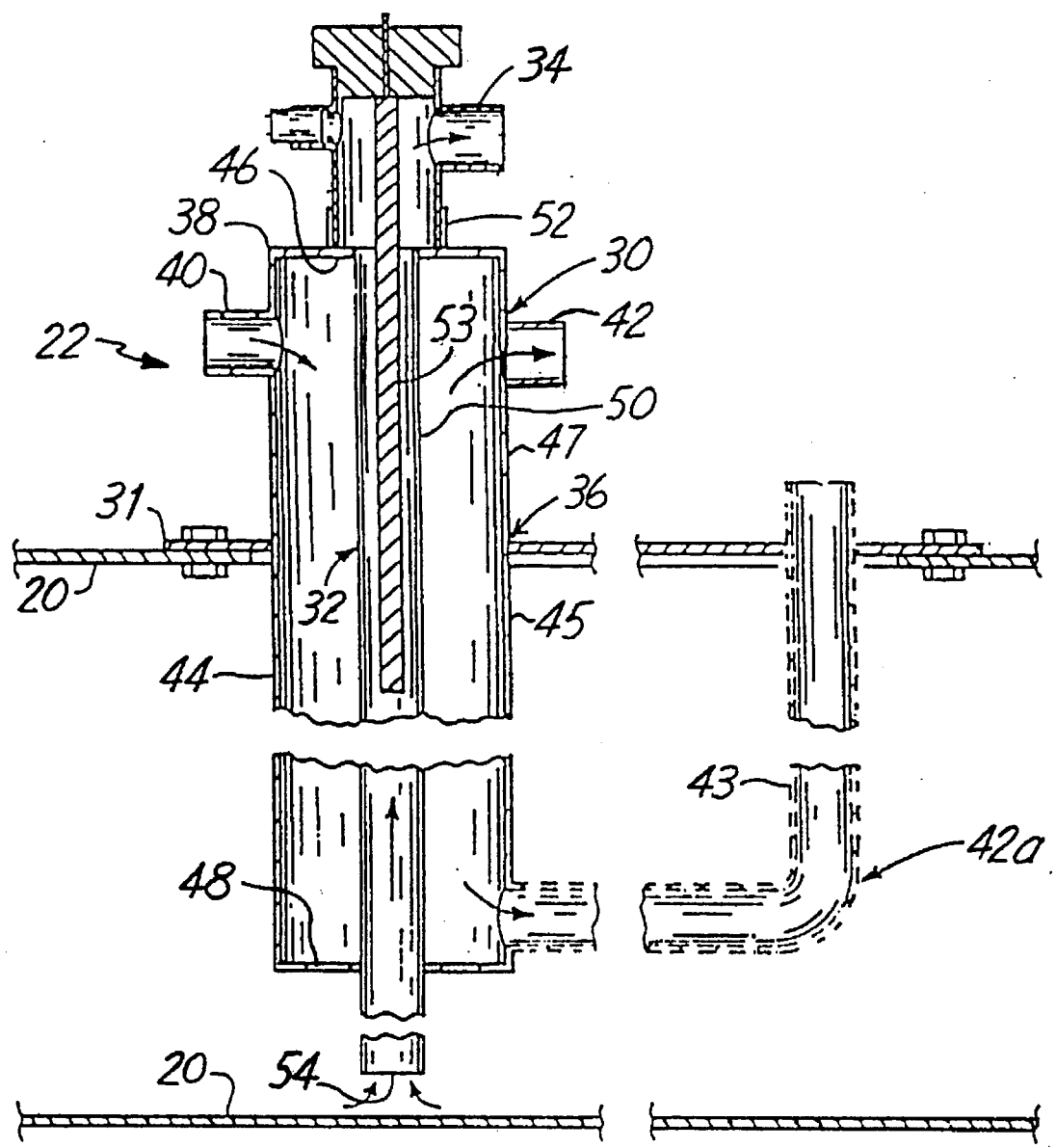
FIG. 1 is a vertical side sectional view of a heating apparatus embodiment of the fuel system configured partially within a fluid reservoir.

Referring to FIG. 1, one embodiment of power fluid or fuel heating apparatus 22 is shown. Fuel heating apparatus 22 generally comprises a variously configured heat exchanger assembly 30, a fuel pickup conduit 32, and a heating unit 34. Fuel heating apparatus 22 is mounted by means of any suitable mounting plate 31 in a fuel reservoir tank 20 through a fuel sending gauge opening 36, or similar opening, for heating both the fuel in the fuel reservoir tank 20 and the fuel pickup conduit 32. As described in U.S. Pat. No. 4,748,960, heat exchanger assembly 30 includes a casing 38 with a fluid inlet 40 and a fluid outlet 42. The heatable fluid may flow in either direction, e.g., fluid may actually enter fluid outlet 42 and exit through fluid inlet 40. Casing 38 has a shell 44, preferably of cylindrical shape, with first and second closed ends 46, 48. An internal portion 45 of casing 38 extends into fuel reservoir tank 20, and an external portion 47 of casing 38 extends out of fuel reservoir tank 20. Fluid inlet 40 and fluid inlet 42 communicates with exterior portion 47 of casing 38.

Fluid outlet 42 may also be configured to communicate with the internal portion 45 of casing 38, as shown in dashed lines and designated as 42a. In such case, fluid outlet 42a may comprise an outlet tube 43 which communicates with the internal portion 45 of casing 38, extending away from casing 38 to the exterior of fuel tank 20. One end of outlet tube 43 is then attached to the interior portion of casing 38 near the second closed end 48.

Fuel pickup conduit 32 is positioned adjacent heat exchanger assembly 30. Fuel pickup conduit 32 comprises a pickup tube 50 and a fuel outlet 52. Pickup tube 50 extends from an aperture in first closed end 46 along shell 44 through an aperture in second closed end 48. Depending on the use, pickup tube 50 may extend to the bottom of fuel reservoir tank 20. Pickup tube 50 terminates at one end with fuel outlet 52, which may comprise any suitable fitting, and at the other end in a fuel inlet 54, which may include a porous filter (not shown) disposed in pickup tube 50.

Heating unit 34 may, optionally, comprise any suitable device for heating the fuel in the fuel pickup conduit 32, including a self-regulating thermal tape or an immersible heating element 53 which extends within fuel pickup conduit 32, terminating within the interior of fuel tank 20. Heat exchanger assembly 30 and fuel pickup conduit 32 may be fabricated from any suitably impervious material, preferably a metal material, and more preferably from stainless steel which resists corrosion and conducts heat well while retaining the advantages of durability and strength.

Various embodiments of heating apparatus 22 for power fluids, such as diesel fuel or hydraulic oil, are shown in FIGS. 2–10. Power fluid heating apparatus 56 generally includes heat exchanger means 58, fuel pickup conduit 60, and pre-heater fuel pickup conduit 62. Fuel heating apparatus 56 is mounted in reservoir tank 20 through a fuel sending gauge opening, or other suitable opening, for heating the fuel in the reservoir tank 20 and the fuel in both the fuel pickup conduit 60, and the pre-heater pickup conduit 62. More than one fuel heating apparatus 56 may be utilized, especially if the vehicle includes more than one fuel tank.

Figure 2:
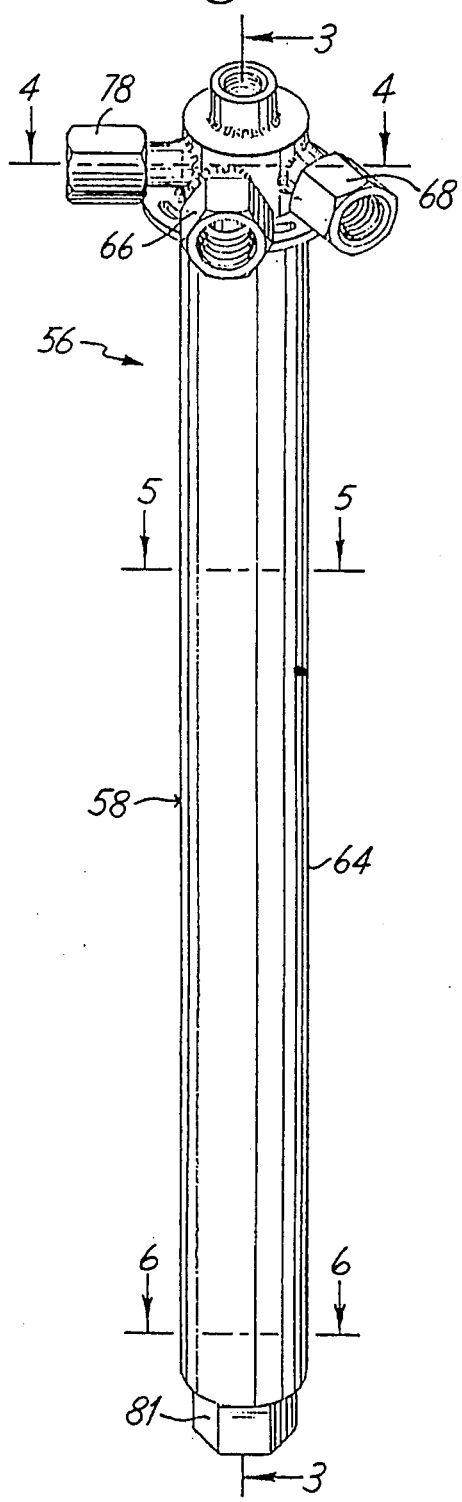
FIG. 2 is a perspective view of an alternate embodiment of the fuel heating apparatus of the invention.
Figure 3:
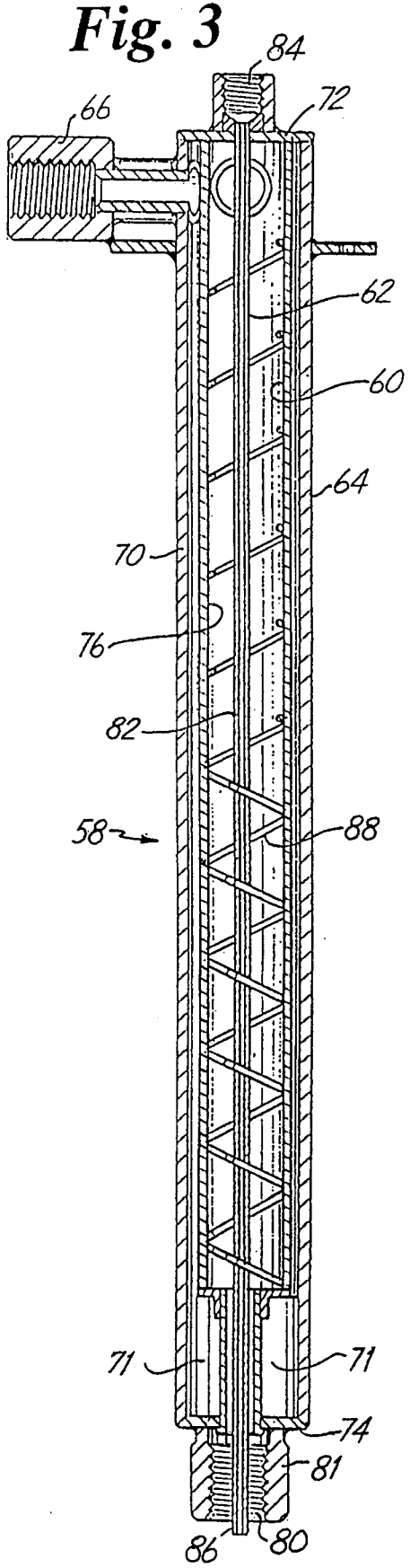
FIG. 3 is a vertical cross-sectional view of the fuel heating apparatus taken along line 3—3 of FIG. 2.

Referring to FIGS. 2 and 3, heat exchanger assembly 58 includes a housing or casing 64 with a fluid inlet 66 and a fluid outlet 68. As discussed with respect to FIG. 1, heatable fluid may run in either direction, such that fluid may enter fluid outlet 68 and exit through fluid inlet 66. Casing 64 preferably has a cylindrical shell 70 with first and second closed ends 72, 74. Cylindrical shell 70 is positioned within fuel reservoir tank 20 so that an external portion of casing 64 extends beyond fuel tank reservoir 20 and an internal portion of casing 64 extends into fuel reservoir tank 20, similar to heating apparatus 22 in FIG. 1. Fluid inlet 66 and fluid outlet 68 communicate with the exterior portion of casing 64. It is recognized that reference to a power fluid reservoir tank may be substituted in many locations for the reference to a fuel reservoir tank while remaining within the scope of this invention.

Fuel line pickup conduit 60 is positioned adjacent heat exchanger assembly 58. Fuel pickup conduit 60 comprises a pickup tube 76 and a fuel outlet 78. Pickup tube 76 extends from an aperture in first closed end 72, along shell 70, through an aperture in the second closed end 80, and preferably to the bottom of fuel reservoir tank 20. To support pickup tube 76 and prevent any exchange of fluid between the fuel pickup conduit 60 and heat exchanger assembly 58, pickup tube 76 is preferably welded to first and second closed ends 72, 74. Pickup tube 76 terminates at one end with fuel outlet 74 and at the other end in fuel inlet 80 which may include a porous filter (not shown) disposed in pickup tube 76. Fuel coupling 81 surrounds fuel inlet 80. Fuel pickup conduit 60 narrows near second closed end 72, forming cavity 71. The heatable fluid flowing through cavity 92, shown in FIG. 4, changes direction in cavity 71 and proceeds toward fluid outlet 68.

Pre-heater fuel line pickup conduit 62 is positioned adjacent fuel pickup conduit 60, suitable for thermal transfer to occur in both conduits. Pre-heater fuel pickup conduit 62 comprises a pickup tube 82 and a fuel outlet 84. Pickup tube 82 extends from an aperture in first closed end 72, within fuel pickup conduit 60, through an aperture in the second closed end 74. Depending on the use, pickup tube 82 may extend to the bottom of fuel reservoir tank 20. Pickup tube 82 terminates at one end with fuel outlet 84, and at the other end in the fuel inlet 86 which may include a porous filter (not shown) disposed in pickup tube 82. Fuel inlet 80 surrounds fuel inlet 86.

Heat distribution means or baffle members 88 may be positioned within fuel pickup conduit 60 to slow the flow rate of fluid therethrough and/or to provide improved heat transfer between the heatable fluid in casing 64 and the fuel in fuel pickup conduit 60. Baffle members 88 may be of various configurations, including for instance, a spiral member or a wire conduction coil. Baffle members 88 may be integrally manufactured with fuel pickup conduit 60 or may be separately inserted therein.

Heat exchanger assembly 58, fuel pickup conduit 60, and preheater fuel pickup conduit 62 may be fabricated from any suitable impervious material, such as aluminum or stainless steel, which resists corrosion and conducts heat well.

Figure 4:
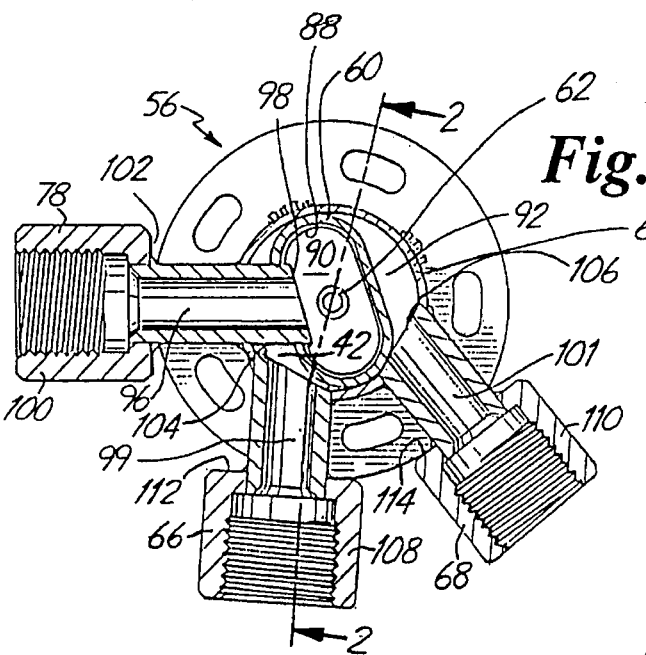
FIG. 4 is a top horizontal sectional view taken along line 4—4 of the fuel heating apparatus shown in FIG. 2.

FIG. 4 illustrates a horizontal top cross section view of heating apparatus 56. Pre-heater pickup conduit 62 is positioned within the cavity 90 formed by fuel pickup conduit 60. Fuel coupling connection line 96 is in fluid communication with the fuel in cavity 90 at end 98, and is attached to fuel coupling 100 at end 102. Fuel outlet 78 receives the power fluid, such as fuel, travelling through pickup conduit 60 and fuel coupling connection line 96. Fluid coupling connection lines 99, 101 are in flow through communication with cavity 92 at end 104, 106, and to coolant couplings 108, 110 at end 112, 114. Fluid inlet 66 and fluid outlet 68 are in fluid communication with the heatable fluid in cavity 92 positioned between casing 64 and fuel pickup conduit 60. Baffle member 88 is positioned within cavity 90.

Figure 5:
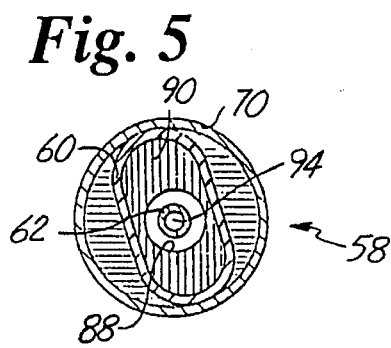
FIG. 5 is a top horizontal sectional view of the power fluid intake conduit and pre-heater power fluid intake conduit taken along line 5—5 in FIG. 2.

A cross section of heat exchanger assembly 58 is shown in more detail in FIG. 5. Cylindrical shell 70 is positioned substantially entirely around fuel pickup conduit 60 and preheater fuel pickup conduit 62. Preheater fuel pickup conduit 62 is, in this embodiment, positioned within the interior or cavity 90 of fuel pickup conduit 60. Fuel pickup conduit 60 is here shown as generally oval in cross section, and preheater fuel pickup conduit 62 is here shown as generally circular in cross section, although the shapes are generally not a critical limitation. Baffle member 88 is positioned within fuel pickup conduit 60.

Figure 6:
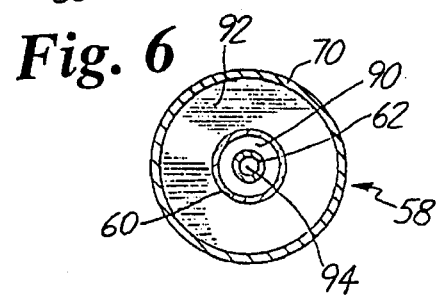
FIG. 6 is a cross-sectional view of the power fluid intake conduit and the pre-heater fluid intake conduit taken along line 6—6 of FIG. 2.

Referring to FIG. 6, another cross sectional view of heat exchanger assembly 58 is shown. Cylindrical shell 70 surrounds fuel pickup conduit 60 which in turn surrounds preheater fuel pickup conduit 62. Cavity 92 permits passage of a heatable fluid, such as engine coolant or exhaust gas, and cavities 90 and 94 permit passage of a power fluid, such as diesel fuel or hydraulic fluids, through fuel pickup conduit 60 and preheater fuel pickup conduit 62.

Figure 7:
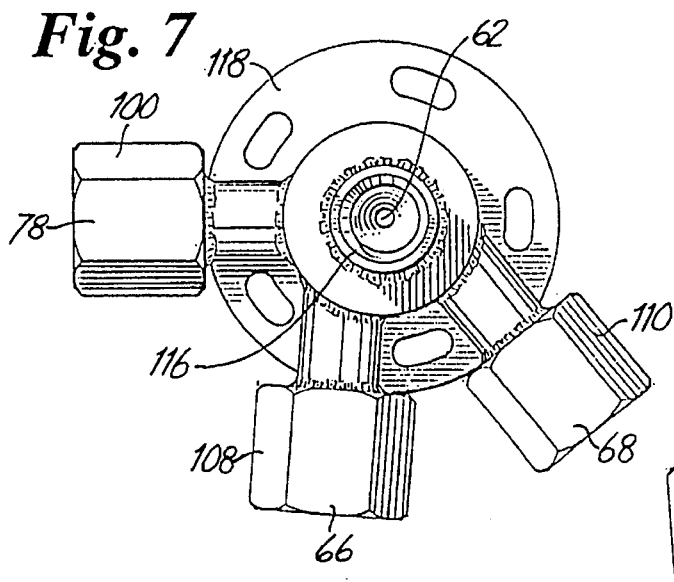
FIG. 7 is a top plan view of the fuel heating apparatus shown in FIG. 2.
Figure 20:
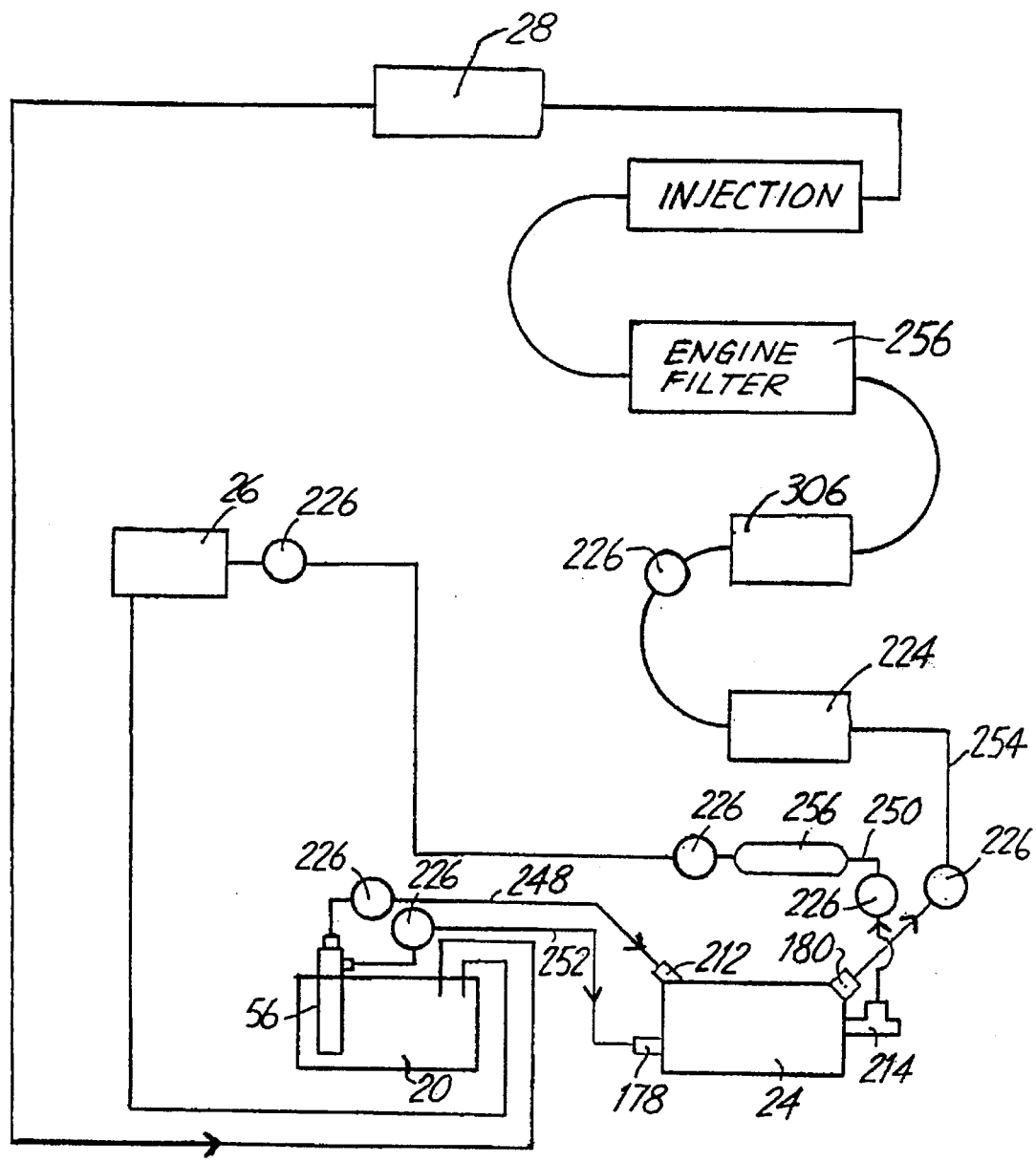
FIG. 20 is a block diagram of a fuel system which incorporates a fuel heating apparatus embodying the present invention.

Referring to FIG. 7, a top plan view of heating apparatus 56 is shown. Preheater fuel pickup conduit 62 is positioned within preheater fuel line fitting 116. Fuel coupling 100 of fuel outlet 78 is attached to a fuel line 254 which directs the power fluid to engine 28, as shown in FIG. 20. Coolant couplings 108, 110 of fluid inlet 66 and fluid outlet 68 are attached to coolant lines 186, 188 which direct the coolant or other heatable fluid through the heating system, as shown Ln FIG. 21. Fluid inlet 66, fluid outlet 68, and fuel outlet 78 are positioned adjacent plate flange 118.

Figure 8:
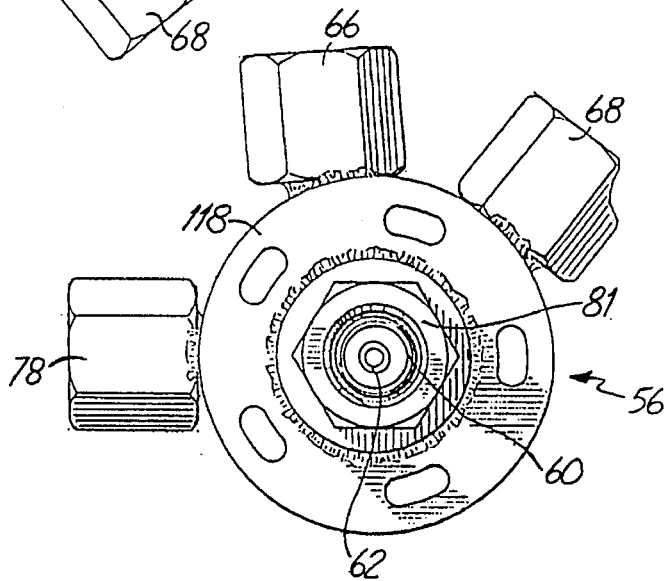
FIG. 8 is a bottom plan view of the fuel heating apparatus shown in FIG. 2.

FIG. 8 illustrates a bottom plan view of heating apparatus 56. Fuel coupling 81 is positioned around fuel pickup conduit 60 and preheater fuel pickup conduit 62.

Figure 9:
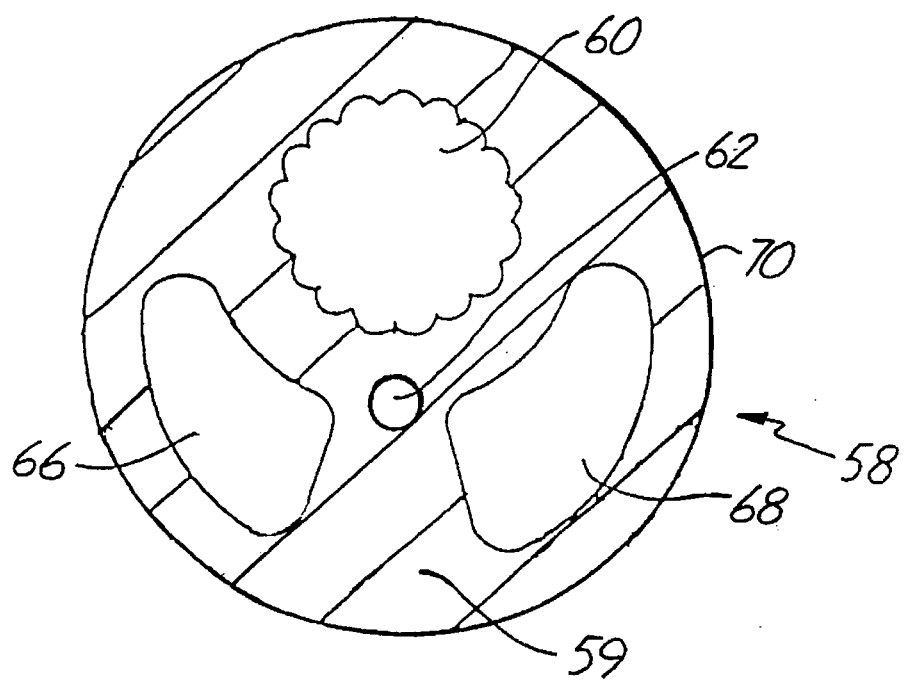
FIG. 9 is a cross sectional view of an additional embodiment of the power fluid intake conduit and pre-heater power fluid intake conduit taken along line 5—5 in FIG. 2.
Figure 10:
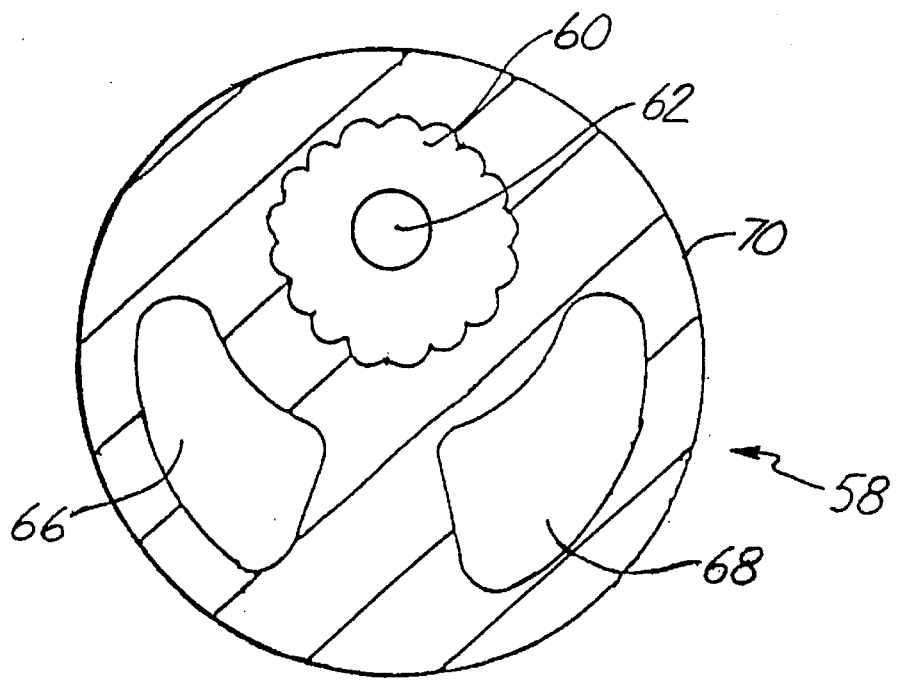
FIG. 10 is a cross sectional view of an alternative embodiment of the power fluid intake conduit and pre-heater power fluid intake conduit analogous to the view of FIG. 9.

Referring to FIGS. 9 and 10, alternative embodiments of heating apparatus 56 are shown. In FIG. 9, preheater fuel pickup conduit 62 is within a solid region adjacent to fuel pickup conduit 60. In FIG. 10, preheater fuel pickup conduit 62 is positioned within fuel pickup conduit 60. In both FIGS. 9 and 10, fluid inlet 66 and fluid outlet 68 are positioned near fuel pickup conduit 60 and preheater fuel pickup conduit 62. As illustrated by FIGS. 9 and 10, fuel pickup conduit 60 and fluid inlet 66 and fluid outlet 68 may be of varying shapes. Heat exchanger 58 illustrated in FIGS. 9 and 10 may be entirely, or partially, extruded. Cylindrical casing or shell 70 is positioned around fluid inlet 66, fluid outlet 68, and fuel pickup conduit 60.

Figure 11:
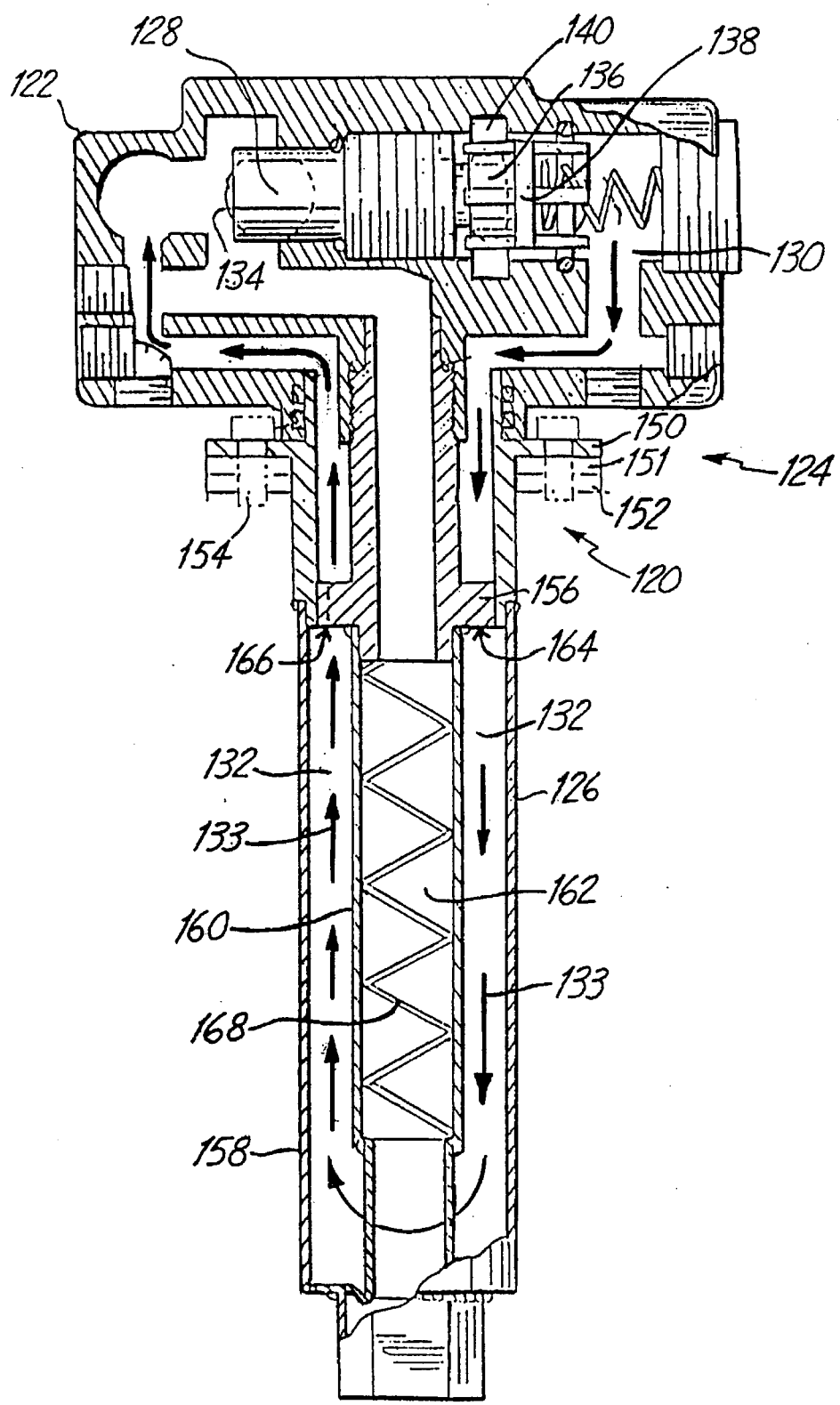
FIG. 11 is a vertical side sectional view of an alternative embodiment of a fuel heating apparatus which may be used in the invention.

FIG. 11 illustrates an alternative embodiment of a heating and bypass apparatus for heating the power fluid, such as diesel fuel or hydraulic fluid, in a reservoir tank. This apparatus is described in more detail in copending U.S. patent application Ser. No. 07/846,752, which is a continuation of U.S. patent application Ser. No. 07/666,233. This bypass device 120 provides means for heating power fluids in power fluid reservoir tanks, heating power fluids in power fluid intake conduits, bypassing coolant flow to prevent such heating cycles, and optionally shutting coolant flow to the device 120 in a more permanent manner than in other automatic cycling options. Bypass device 120 comprises a head section or manifold means 122, mounting means 124, and heat exchanger casing means 126. Manifold means 122 comprises various flow chambers and sub-assemblies for routing coolant fluid and power fluid therethrough. As illustrated in FIG. 11, bypass valve means comprising self-contained wax motor assembly 128 is operable to selectively admit flow of a heatable or coolable fluid from a source external to bypass device 120 through manifold means 122, coolant flow chamber 130 and through casing means coolant flow chambers 132, as shown in dark arrows.

Figure 12:
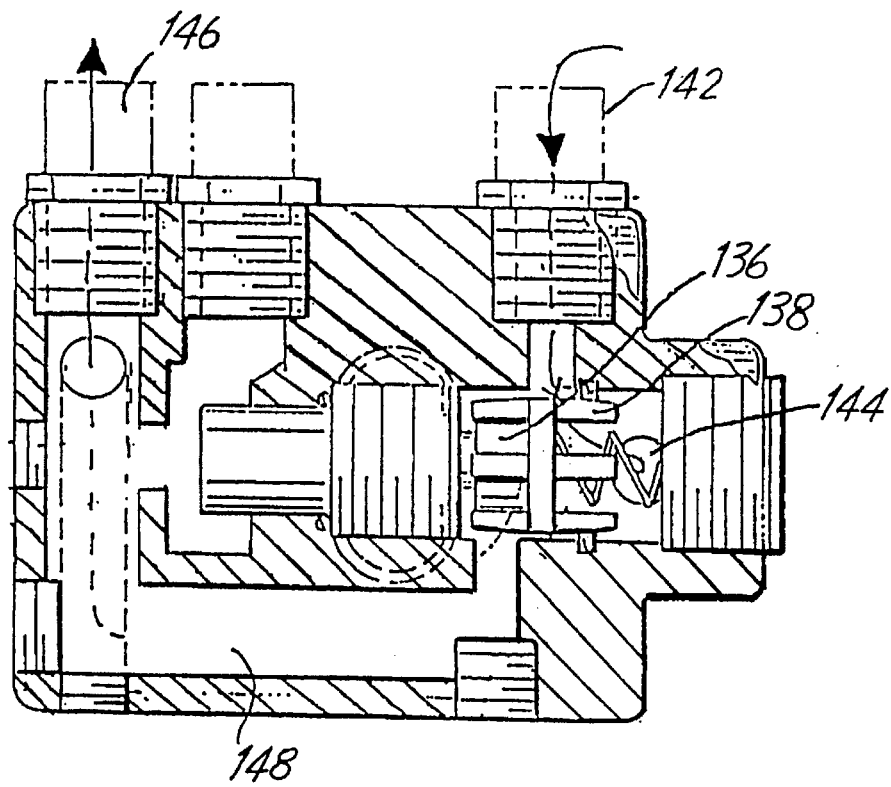
FIG. 12 is a top sectional view of a manifold means according to the invention.

Referring to FIGS. 11 and 12, self-contained wax motor assembly 128 comprises a power fluid temperature sensing end 134 and a temperature responsive piston or telescoping stem 136. Telescoping stem 136 is constructed and arranged for movement and carriage of a bypass cap 138 in relation to bypass groove 140. The position of bypass cap 138 permits flow of a heatable fluid, such as engine coolant fluid, from a coolant inlet section 142 into coolant flow chamber 130, and out of coolant outlet section 146. Alternatively, bypass cap 138 is positioned to receive heatable fluid in a manner which routes it through manifold means bypass chamber 148 and out of coolant outlet section 146 without any flow into the casing means coolant flow chamber 132.

Mounting means 124, shown in FIG. 11, comprises mounting plate 150 which is optionally constructed and arranged for mounting over the fuel gauge sending plate 152 of a fuel reservoir tank 20. Gasket 151 is positioned between mounting plate 150 and plate 152 so that a good seal is created to prevent leaks. Suitable mounting means 154 is provided and may be mounted through apertures in the mounting and sending plates of varying sizes and shapes to permit optimum flexibility and mounting arrangements. Thus, mounting means 124 is mounted so that sub-tending casing means 126 extends into a reservoir tank, such as a fuel tank, to provide improved heat transfer properties and bypass capabilities for the entire system.

Casing means 126 comprises baffle assembly 156, outer casing 158, power fluid intake conduit 160, and power fluid intake flow chamber 162. Outer casing 158 preferably comprises a cylindrical, heat conductive, external shell, preferably of durable steel construction which is arranged for insertion into a reservoir tank for contact with a volume of stored power fluid. Inlet means 164 is provided for admitting a heatable fluid into casing means coolant flow chambers 132, and outlet means 166 is provided for discharging the heatable fluid from the heat conductive portion of the heat exchanger means, including the outer casing 158, thus substantially entirely surrounding the power fluid intake/pickup conduit 160 between the inlet 164 and the outlet 166.

In addition to routing of heatable fluid or coolant within the portion of bypass device 120 comprising the heat exchanger means casing means 126, baffle means is provided within power fluid intake conduit 160 in order to slow the flow rate of fluid therethrough and/or to provide improved heat transfer between the heatable fluid in the casing means coolant flow chambers 132 and the power fluid flowing through the power fluid intake/pickup conduit 160. This promotes greater heat rise, if desired, as the power fluid flows through bypass device 120. In addition, this feature provides an improved heat distribution means within the intake/pickup conduits for the fluid in the reservoir tank passing through the bypass device.

Various configurations of heat distribution means are provided and encompassed within the scope of this invention. For instance, as shown in FIG. 11, a spiral member 168 is provided within power fluid intake conduit flow chamber 162. This heat distribution means may be integrally manufactured with power fluid intake conduit 160 or may be separately inserted therein.

Figure 13:
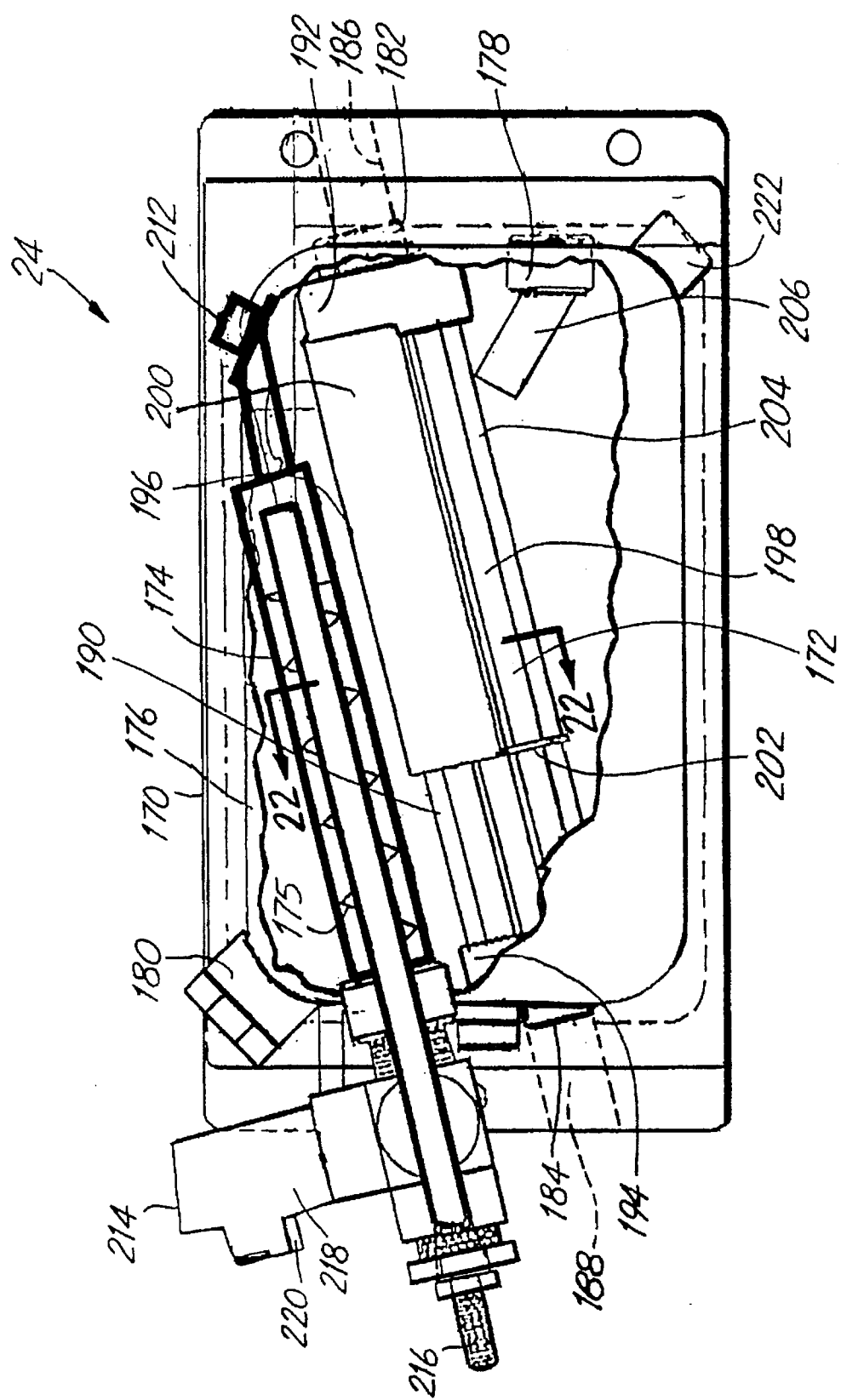
FIG. 13 is a top sectional view of a water separating apparatus in which portions are cut away to permit a view of the interior of the apparatus.

Referring to FIG. 13, an exemplary power fluid preheater/water separating apparatus is shown, which is similar to that discussed in U.S. Pat. No. 4,933,077. Water separator 24 may be used to electrically preheat fuel for fast starting of the vehicle, to continue warming fuel to optimum operating temperatures, and to manually dispose of any water collected in the fuel system. Water separating device 24 uses a heatable fluid, such as engine coolant, and battery current to warm an electric heating element which in turn heats the diesel fuel to the optimum temperature for efficient engine operation in cold weather. Water separator 24 is preferably made of an impervious material, such as stainless steel.

Water separator 24 generally comprises a reservoir 170, a heat exchanger 172, and an electric heating element with an internal baffle 175. Reservoir 170 includes a container 176 which is generally in the shape of a rectangular prism or parallelpiped. Reservoir 170 also includes fuel inlet 178 and a fuel outlet 180 disposed in container 176 for communication between the inside of container 176 and other fuel system components. Fuel inlet 178 is attached to fuel line segment 252, and fuel outlet 180 is attached to fuel line segment 254, as shown in FIG. 20, by any appropriate means.

Figure 21:
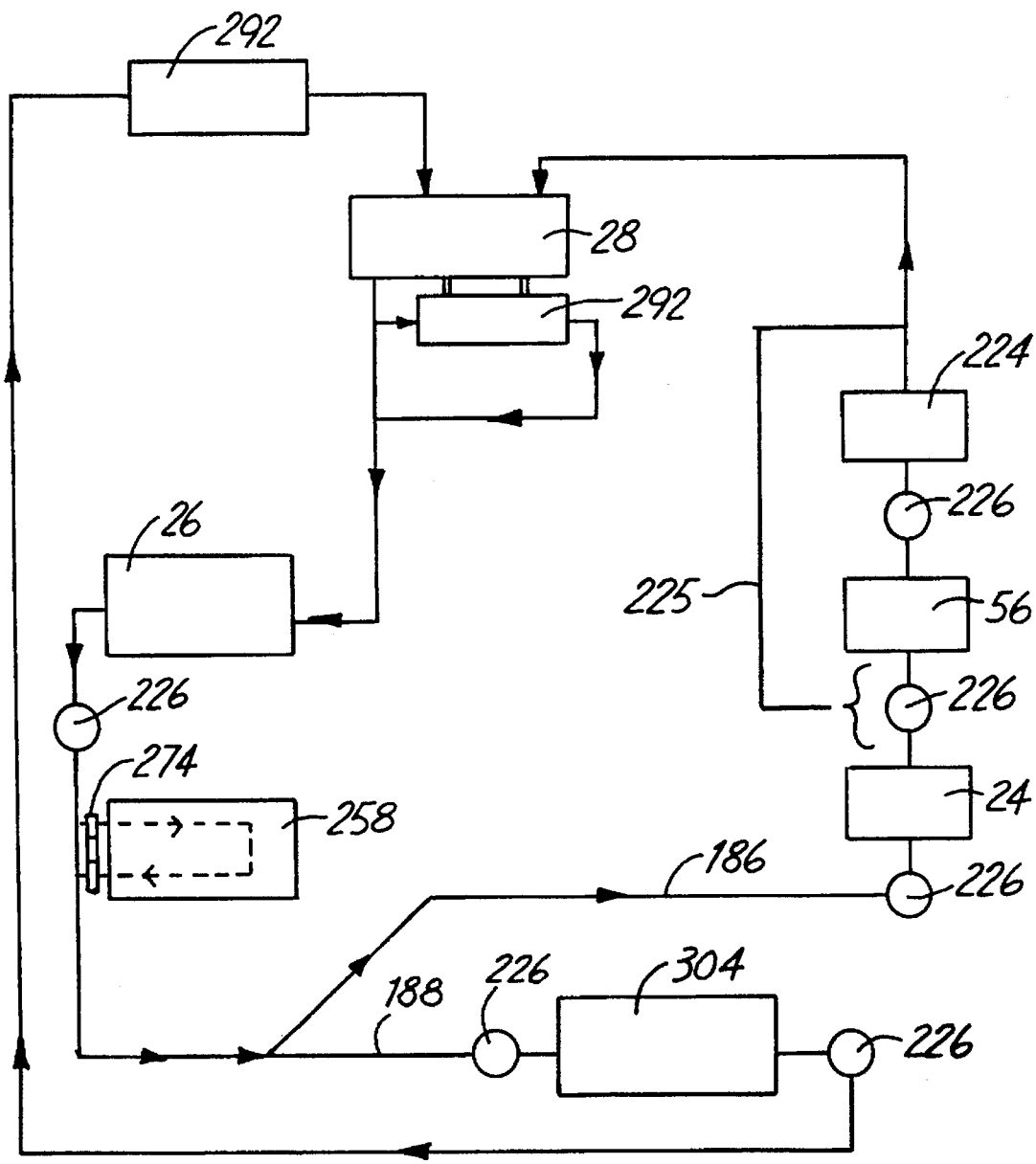
FIG. 21 is a block diagram of the coolant system which is used in conjunction with the fuel system in FIG. 12 to heat the fuel.

Reservoir 170 also includes a coolant inlet 182 and a coolant outlet 184 which are connected via coolant lines 186, 188, shown in FIG. 13 and 21, to any convenient source of fluid bearing waste heat, such as exhaust gas, engine coolant, or motor oil. Engine coolant is regarded as the preferred choice because of its relatively low corrosiveness. The coolant lines 186, 188 may be connected to coolant inlet 182 and coolant outlet 184 by clamping, screwing, or any other appropriate means.

Heat exchanger 172 comprises at least one tube 190 running between coolant inlet 182 and coolant outlet 184 through container 176 of reservoir 170. Heat exchanger 172 includes several tubes 190 running in an essentially parallel fashion between coolant inlet 182 and coolant outlet 184, but the dispositions of the tubes 190 may also vary within the scope of the invention. In the present embodiment, nine tubes are utilized, but the number and size of the tubes may vary within the scope of the invention. A first header 192 distributes incoming coolant from coolant inlet 182 to the tubes 190. A second header 194 integrates coolant from tubes 190 and directs the coolant out through coolant outlet 184. Other means for distributing coolant to and integrating coolant from a plurality of tubes, such as splitting elements, may be used.

Heat exchanger 172 also comprises a shroud or enclosure 196 disposed inside container 176 of reservoir 170. Enclosure 196 partially surrounds a portion of tubes 190 to define a pre-heat chamber 198. Fuel flowing into pre-heat chamber 198 is better maintained adjacent to tubes 190 within preheat chamber 198 and thus is heated more efficiently, thereby encouraging water contaminants to precipitate out of fuel. Enclosure 196 is of a generally cylindrical shape and is made up of a half cylindrical shell 200 disposed essentially coaxially with tubes 190 and a baffle plate 202 at another end of shell 200. Alternatively, enclosure 196 could have other overall shapes, and could be constructed in a one-piece fashion or be made up of a plurality of enclosure components.

Enclosure 196 has a first opening 204 which communicates with fuel inlet 178 to receive incoming fuel into pre-heat chamber 198. In the present embodiment, the half cylindrical shell 200 is disposed such that an open half of shell 200 faces fuel inlet 178. A fuel duct 206 extending from fuel inlet 178 is disposed so as to direct incoming fuel through first opening 204 into pre-heat chamber 198.

Figure 22:
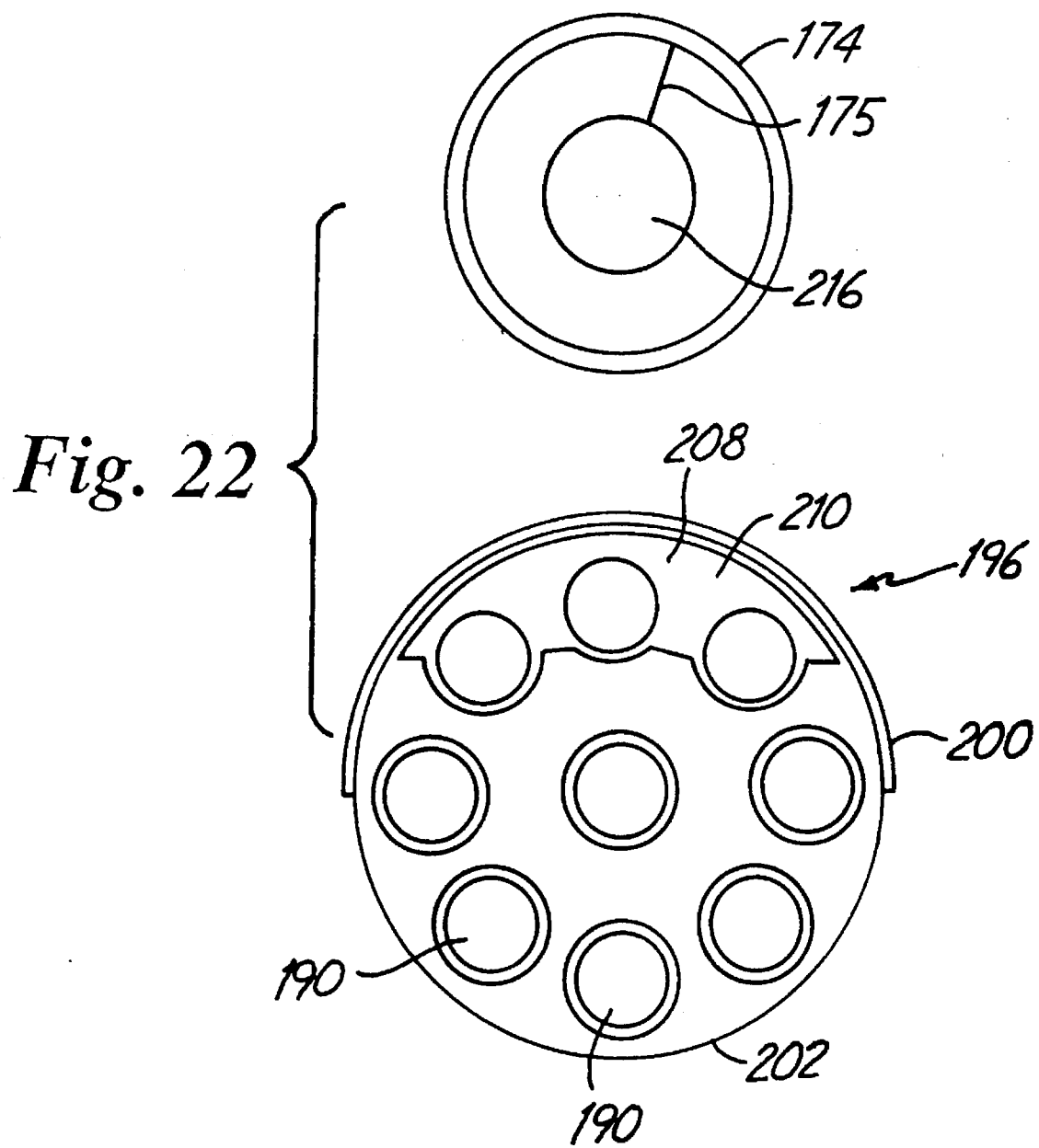
FIG. 22 is a cross-sectional view along line 22—22 of FIG. 21.

As in previously mentioned U.S. Pat. No. 4,933,077 to Wolf, and as shown in FIG. 22, enclosure 196 also has a second opening 208 which communicates with fuel outlet 180 to direct outgoing heated fuel to fuel outlet 180. The second opening is in the form of an orifice 210 in baffle plate 202 facing fuel outlet 180. Heated fuel flowing out of pre-heat chamber 198 through orifice 210 is thus directed toward fuel outlet 180. The fuel confined inside preheat chamber 198 is heated at an advantageously high rate, thereby causing water contaminants to precipitate from the fuel and further eliminating waxing. Since this fuel is then directed out of the pre-heated chamber 198, through orifice 210 to the fuel outlet 180, and to engine 28, engine performance is further enhanced.

To urge fuel to flow axially through pre-heat chamber 198 toward orifice 210, fuel duct 206 is disposed at an acute angle relative to the axis of half cylindrical shell 200. As a result, incoming fuel directed into pre-heat chamber 198 by fuel duct 206 flows at an acute angle relative to the axis of shell 200. The fuel is then redirected along the axis of shell 200 by the shell 200 itself.

When a cold engine is first started, a period of time must elapse before fluids such as engine coolant and motor oil are sufficiently warmed to heat the fuel sufficiently to prevent waxing and to cause water contaminants to precipitate from the fuel. Consequently, an electric heating element 174 is disposed inside reservoir 170 to preheat the fuel which can be utilized to start the coolant heating system. Electric heating element 174 is generally operated only during a cold start or at any time necessary to produce good engine performance. Electric heating element 174 also includes a fuel inlet 212 and a fuel outlet 214. Electric heating element 174 preferably has sufficient volt and watt capacity and capabilities to heat the fuel sufficiently for the intended use. Heating element 174 may contain, in thermal connection with baffle 175, a cal rod or watt rod 216 which varies in length, depending on the application. Both fuel inlet 212 and fuel outlet 214 are attached to cal rod 216 by a half coupling. Fuel inlet 212 is attached to fuel line segment 248, and fuel outlet 214 is connected to fuel line segment 250, as shown in FIG. 20, by any appropriate means. Street tee 218 includes fuel outlet 214. Thermostat or fuel sensor 220 is mounted in street tee 218 to sense the temperature of the fuel as the fuel exits water separator 24 and proceeds to coolant preheater 26, shown in FIGS. 14, 20 and 21. A probe in fuel sensor 220 extends into street tee 218 when street tee 218 is tightened so that the probe is able to sense the temperature of the exiting fuel. Electric heating element 174 is in a generally parallel orientation to heat exchanger 172. Heating element 174 may be positioned at any part of reservoir 170 which, depending on the shape and dimensions of the reservoir, would enable heating element 174 to quickly provide heated fuel to coolant heater 26.

Reservoir 170 also includes a water outlet 222 for purging accumulated water from reservoir 170. Water outlet 222 includes a selective valve (not shown) which permits egress of water while substantially preventing egress of fuel.

A mechanical thermostat 224, shown schematically in FIG. 20 and 21, is used to sense the temperature of the fuel which passes from water separator 24 as the fuel is directed towards engine 28. A push rod expands in thermostat 224 to shut off or bypass the coolant loop shown at 225 in FIG. 21 after the fuel has reached the desired or optimum operating temperature so that the fuel is not heated further by the coolant. However, thermostat 224 automatically opens when the temperature of the fuel drops so that the coolant may be utilized again as a heat source to heat the fuel. Thermocouples 226 may optionally be used at various points in the fuel heating system to check the temperature of the fuel and coolant so that the fuel and coolant may be maintained at an optimum temperature.

Figure 14:
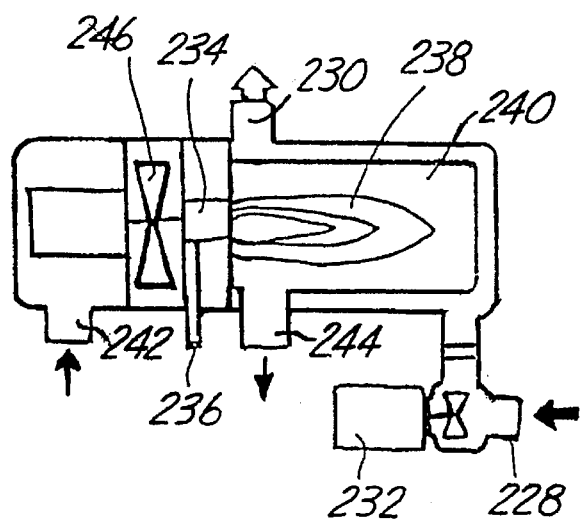
FIG. 14 is a schematic of an exemplary coolant pre-heater used in the fuel heating system.

FIG. 14 illustrates an exemplary fuel fired coolant heater 26 which may be utilized to preheat the power fluid in this fuel heating system. A heatable fluid, such as engine coolant, enters coolant inlet 228 and exits coolant outlet 230. Circulating pump 232 causes the coolant to circulate throughout this system. Fuel pump 234 creates a suction which causes the fuel from water separator 24 to enter fuel pipe 236 of coolant heater 26. The fuel enters combustion chamber 238 which includes heat exchanger 240. Combustion air intake 242 draws in air needed for combustion of the fuel, and any byproducts exit through exhaust pipe 244. Combustion air fan or blower 246 blows heat from the combusted fuel onto the coolant in order to heat the coolant. A fuel fired coolant heater is preferred for the fuel heating system, although any independent auxiliary heater may be utilized.

Referring to FIG. 20, a first segment 248 of a fuel line runs from fuel reservoir tank 20 to fuel inlet 212 in water separator 24, and a second segment 250 of the fuel line runs from the fuel outlet 214 to coolant heater 26. A third segment 252 of a fuel line runs from fuel reservoir tank 20 to fuel inlet 178 in water separator 24, and a fourth segment 254 of the fuel line runs from fuel outlet 180 to engine 28. Segments 248, 252 of the fuel line may be attached to the fuel inlets 178, 212 and segments 250, 254 may be attached to fuel outlets 180, 214 by any appropriate means, such as clamping or screwing. Also, a fuel system according to the invention may include a fuel filter 256 disposed downstream from the water separating apparatus 24. Such a fuel filter 256 may be disposed in segments 250, 254 of the fuel line, as shown in FIG. 20.

The fuel heating system in accordance with the invention may include a battery warmer system. Battery warmer system 258 is used to keep the battery warm during long down periods of a vehicle or when the vehicle is turned off over night in cold weather. Keeping the battery warm has a substantial effect on the cranking power of the battery, which can be crucial to starting the vehicle in cold weather. The battery is used to warm the fuel passing through water separator 24, ignite fuel fired coolant heater 26, and start engine 28.

Figure 15:
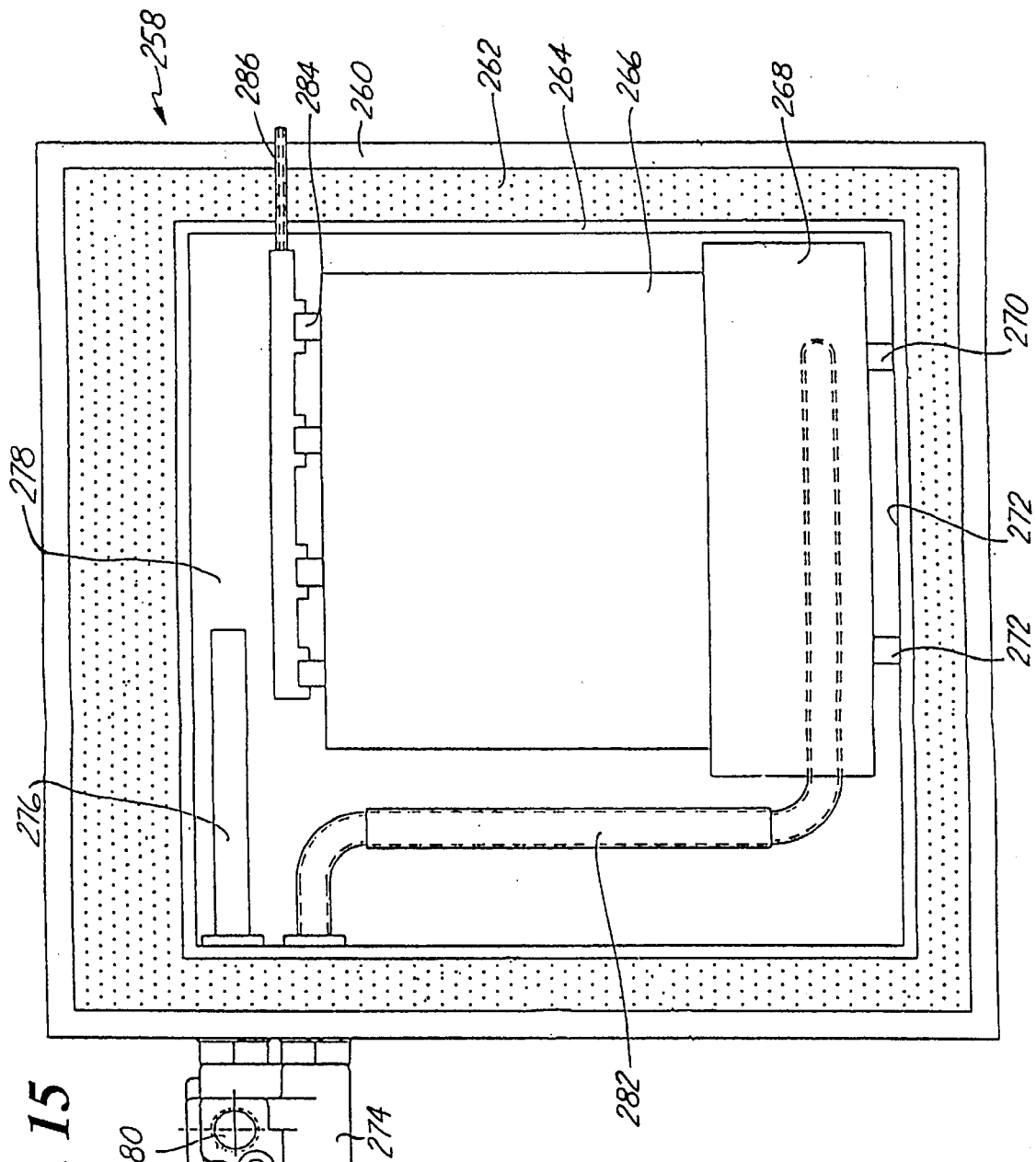
FIG. 15 is a vertical side sectional view of a battery warmer system which may be utilized in the fuel heating system of the present invention.

FIG. 15 is a vertical sectional view of the battery warmer system 258. Battery box 260 is a completely enclosed, tightly sealed box. An insulating layer 262 and a metallic reflective layer 264 are positioned adjacent battery box 260. Battery 266 is positioned on heat exchanger housing 268 within battery box 260. Heat exchanger housing 268 rests on insulating spacers 270 on the base 272 of battery box 260. A bypass thermostat 274, such as described in U.S. Pat. No. 4,964,376, is positioned adjacent battery box 260 so that temperature probe 276 extends into the interior 278 of battery box 260. Engine coolant inlet 280 permits passage of coolant through bypass thermostat 274 into heat exchanger housing 268 through inlet hose 282. Coolant exits heat exchanger housing 268 through an outlet hose (not shown). Battery filler caps 284 are connected to vent tube 286 to direct gases out of battery box 260 in order to maintain the integrity and tight seal of battery box 260.

Figure 16:
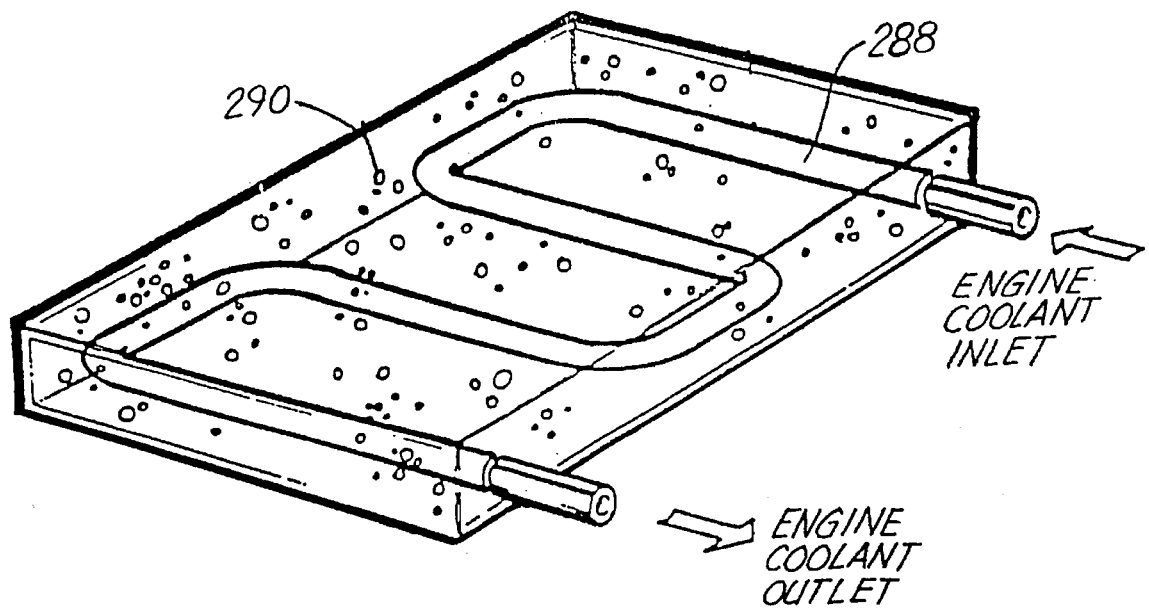
FIG. 16 is a perspective view of the heat exchanger components used in the battery warmer system in FIG. 15.

As shown in FIG. 16, heat exchanger housing 268 includes a heat exchanger 288 and phase change material 290. Heat exchanger 288 may be of various configurations, such as the sinuous shape in FIG. 16. In general, phase change material 290 completely fills the heat exchanger housing 268. A wide variety of phase change materials may be utilized, depending on an optimization of heat of fusion, density, sub-cooling behavior, cost, and physical characteristics.

The battery warmer system operates by circulating warm engine coolant through heat exchanger 288 in heat exchanger housing 268 which contains a suitable phase change material 290. Heat exchanger housing 268 is in intimate thermal contact with battery 266, so the circulating coolant stores heat in the phase change material 290 and warms battery 266 while the engine 28 is running. Phase change material 290 absorbs heat from the warm engine coolant, and changes from a solid phase to a liquid phase while the vehicle is running. After engine 28 is turned off, phase change material 290 continues to hold heat while in the liquid phase. As the phase change material 290 slowly solidifies, it gives up heat, thereby keeping battery 266 warm for an extended period of time. The length of time the battery warmer system 258 can keep battery 266 warm is dependent on how much phase change material 290 is used, what type of phase change material 290 is selected, how effectively the battery box is sealed and insulated, and the battery size.

Coolant enters battery box 260 through coolant inlet 280 on bypass thermostat 274, and passes through inlet hose 282 to heat exchanger housing 268. After passing through heat exchanger 288, the coolant exits through outlet hose (not shown). When temperature probe 276 senses ambient battery box temperature, the coolant bypasses battery box 260 so that there is no more heating of battery box 260 by the coolant. The warm coolant proceeds to engine 28 or other components within the system.

Exhaust heat from the vehicle or from coolant heater 26 can be utilized along with the coolant to heat the heat exchanger housing 268. The exhaust heat can be in the heat exchanger with the coolant, or the exhaust heat may be in a separate chamber.

Figure 17:
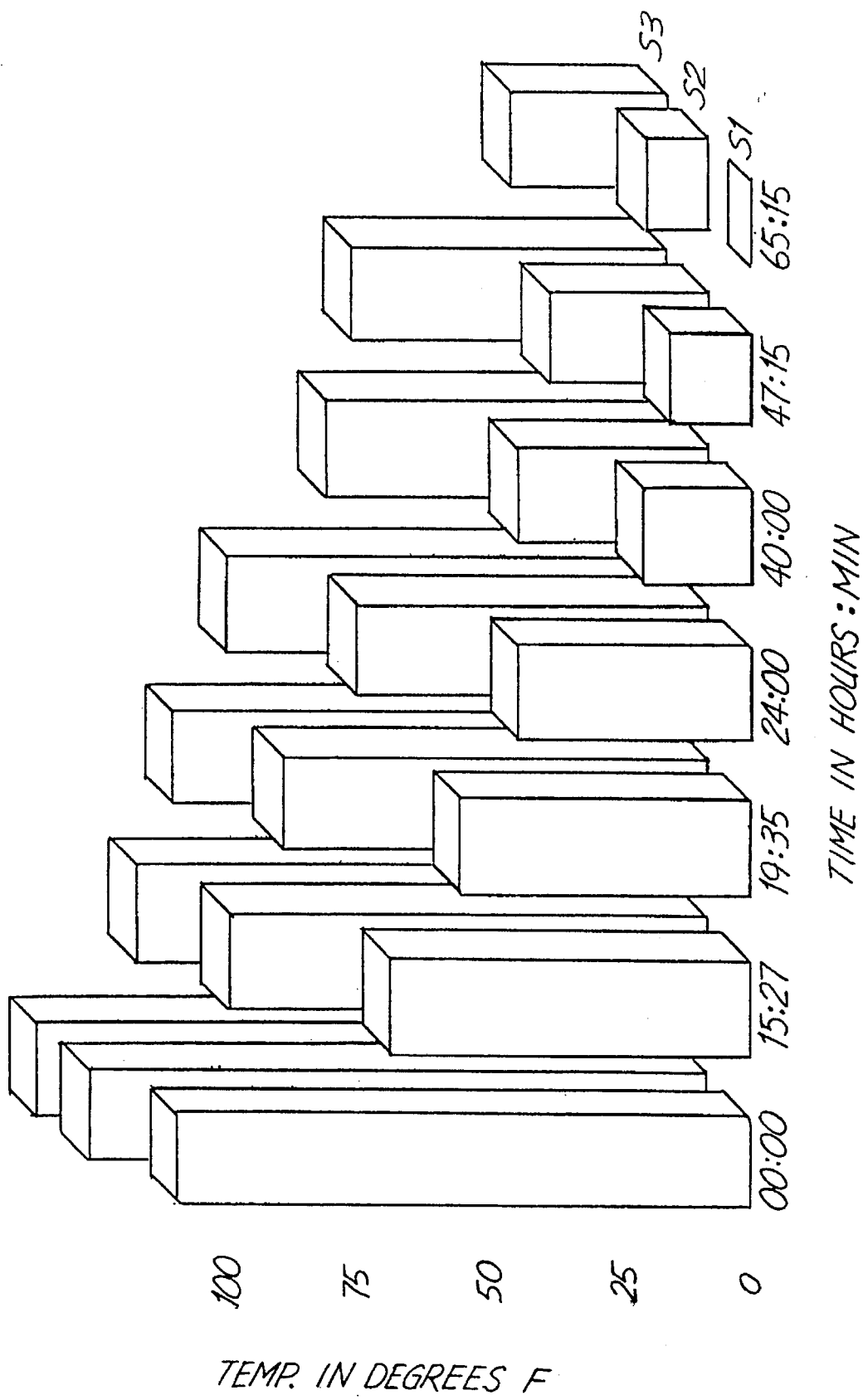
FIG. 17 is a graph depicting the battery temperature at different points of time after use of the battery warmer system.

As shown in FIG. 17, battery warmer system 258 has surprising and unexpected advantages over systems currently utilized. The first row, S1, of the graph was a test using a simple stainless tube heat exchanger to warm the base plate of an insulated battery box. Sample 2, S2, contained a 60/40 mixture of ethylene glycol and water plus a stainless steel tube heat exchanger. Sample 3, S3, contained phase change material plus a stainless steel tube heat exchanger. The three battery box systems were placed in an environmental chamber at a temperature of −22° F. (−30° C). After more than 65 hours, the electrolyte cell in the sample 1 battery box was at 0° F. The electrolyte cell in the second sample battery box, S2, was at 12° F. In the battery box of the third sample, S3, the electrolyte cell was at a temperature of 28° F. Thus, after a significant passage of time without the engine running, the battery in the S3 sample was significantly warmer than the ambient temperature in the environmental chamber.

Figure 18:
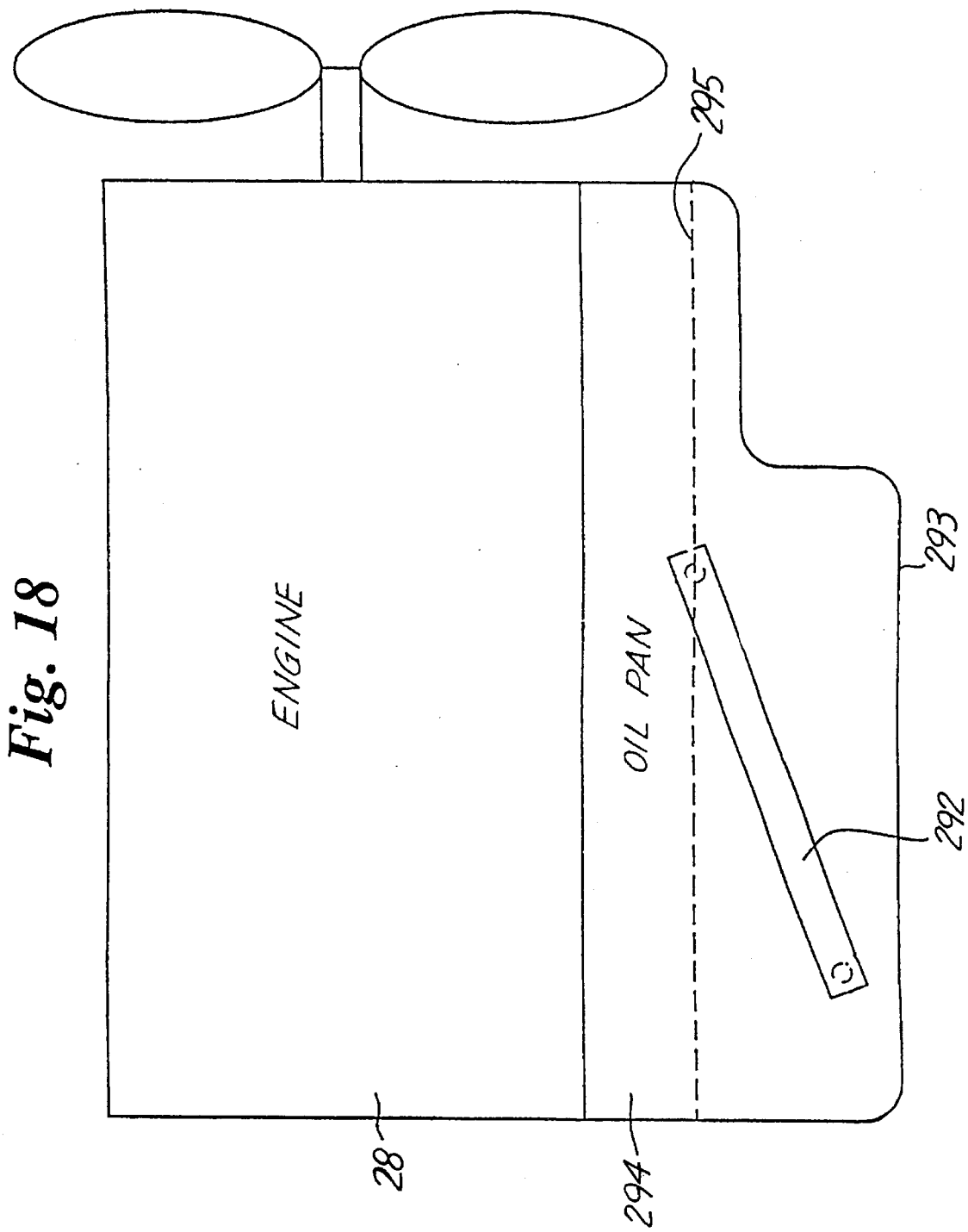
FIG. 18 is a perspective view of a heat exchanger used to heat an oil pan.

In addition to having a warm battery when the vehicle is first started, it is also advantageous to have fluid, such as oil, warm so that there is oil pressure right when the vehicle is started. As shown in FIG. 18, heat exchanger 292 may be positioned adjacent an oil pan 294. In general, oil pan 294 is positioned beneath engine 28. Heat exchanger 292 is generally positioned at a slight angle to oil pan 294, extending from the base 296 of oil pan 294 toward the oil level 295.

Referring to FIGS. 19a and 19b, heat exchanger 292 is shown in more detail. Engine coolant or another warm fluid enters coolant inlet 294 and is routed through tubes 296 in heat exchanger 292. The coolant or other warm fluid exits coolant outlet 298. The oil enters heat exchanger 292 at inlet 300, passes through heat exchanger 292, and is warmed by heat transfer from the engine coolant in tubes 296. The warmed oil exits through outlet 302 at oil level 295 in oil pan 294. Oil enters heat exchanger 292 near the bottom 293 of oil pan 294. A convection flow is used to heat the oil since the warmed oil rises through heat exchanger 292 to exit through outlet 302, causing the cold oil to enter inlet 300.

Referring again to FIGS. 20 and 21, a fuel system incorporating the above described components according to the invention is depicted in schematic form. Battery warmer system 258 may be utilized to keep the battery warm during vehicular shut down time. Battery 266 provides current to heat electric heating element 174 in water separator 24. A toggle switch (not shown) in the vehicle turns on cal rod 216 in electric heating element 174 to heat the fuel in water separator 24 which will be utilized to start coolant heater 26. Electric heating element 174 thus functions as a power fluid start-up heater. Cold fuel is drawn into the heating apparatus. If fuel heating apparatus 56 is utilized, power fluid, such as diesel fuel, is drawn, through fuel inlet 86, and proceeds through pre-heater fuel pickup conduit 62 and exits fuel outlet 84. The cold fuel travels through first portion 248 of the fuel line, and enters fuel inlet 212 of water separating device 24. The cold fuel enters electric heating element 174, and is heated by cal rod 216 as the fuel travels through electric heating element 174. The fuel remains within electric heating element 174 for a preset period of time, such as five minutes. If it is determined that a longer period of time is needed to preheat the fuel based on the ambient conditions, a manual override can be utilized to increase the length of the preheating time. The temperature of the fuel exiting the electric heating element 174 will vary depending on the length of time the fuel was preheated, and the ambient temperature. Fuel sensor 220 measures the temperature of the exiting fuel. If the fuel is at a predetermined temperature, such as 140° F., electric heating element 174 will shut off. The fuel will continue to be heated by heat transfer from tubes 190 in preheat chamber 198.

After the fuel has been preheated in water separating device 24, a second switch in the vehicle is engaged, which initiates coolant heater 26. As a result, a fuel pump in coolant heater 26 draws the preheated fuel out of electric heating element 174 in water separator 24, and the fuel exits water separator 24 through outlet 214. The warmed fuel proceeds through second segment 250 of the fuel line, passes through a filter, and enters coolant heater 26.

Coolant heater 26 circulates coolant through the system. Fuel is combusted in coolant heater 26, which gives off heat. The coolant is heated as it passes blower 246, and the warm coolant is circulated throughout the heating system, as shown in FIG. 21. Heatable fluid, such as engine coolant, is used as a heat source to heat and thaw battery warmer system 258, water separator 24, heating apparatus 56, 22, 120, engine 28, heat exchanger 292, hydraulic heaters 304, fuel reservoir tank 20 and any other components in the system. Coolant heater 26 is allowed to run for a period of time until all of the engine and system components have thawed, and the coolant and the fuel are heated to a predetermined temperature, such as 160° F. Unused fuel exits coolant heater 26 and returns to reservoir tank 20.

As illustrated in FIG. 21, a heatable fluid, such as engine coolant, exits coolant heater 26 and enters bypass thermostat 274 through coolant inlet 280. Phase change material 290 is heated as the coolant passes through heat exchanger 288. When sensor rod 276 senses that the ambient battery box temperature has been attained, the coolant is bypassed from battery box 260 and proceeds toward water separator 24, heating apparatus 56, engine 28, or other components used in the heating system. Alternatively, the coolant routed from battery box 26 may be directed toward hydraulic heaters 304, and then to heat exchanger 292 to further heat the coolant before the coolant proceeds to engine 28.

Once the system has been warmed by the coolant, and coolant is at the predetermined temperature, coolant heater 26 shuts down. Engine 28 is then started by turning the vehicle key. As engine 28 is started, an engine suction pump is activated, which causes fuel to be drawn out of fuel reservoir tank 20, into fuel inlet 80, and through fuel pickup conduit 60, as the heatable fluid circulates through heat exchanger assembly 58. The warmed fuel exits heating apparatus 56 through fuel outlet 84, and travels through segment 252 to fuel inlet 178 of water separating device 24. The fuel proceeds through fuel duct 206 into preheat chamber 198 through first opening 204. Fuel is further heated by being adjacent to tubes 190 which contain a heatable fluid, such as engine coolant. Heated fuel flows out of preheat chamber 198 through orifice 210, and is directed toward fuel outlet 180 of water separator 24.

Fuel exiting fuel outlet 180 of water separator 24 proceeds through segment 254 of the fuel line and proceeds to mechanical thermostat 224, as shown in FIG. 20. If the fuel has not reached a preset temperature, such as 80° F., the fuel flows through mechanical thermostat 224, and the fuel is heated further by warm coolant. The fuel then proceeds through the fuel line to the transfer pump 306 which transfers the fuel to engine 28. The warmed fuel also proceeds through an engine filter 256 which removes particles, water, or other foreign materials, and injectors which feeds the fuel to engine 28 so that the engine runs. Unused fuel returns to fuel reservoir tank 20. If the fuel has reached the preset temperature, the coolant flow through thermostat 224 is shut off when the push rod expands, bypassing the coolant flow at 225 toward engine 28 as shown in FIG. 21.

For the heating apparatus described in FIG. 1 and FIGS. 11 and 12, fuel, or other power fluids, travel up power fluid intake conduit 160 or fuel line pickup conduit 32 and progresses through water separating device 24 and coolant heater 26, as discussed above. After the components of engine 28 are warmed, and engine 28 is activated, fuel is drawn again through intake conduit 160 and pickup conduit 32 and a control mechanism (not shown) is switched, such as by a valve member, so that the fuel enters fuel inlet 178 of water separator 24, proceeds through thermostat 224, transfer pump 306, engine filter 256, and the injectors to engine 28, as discussed above.

Combining the components to create the fuel heating system described herein is advantageous in that the engine does not need to be started with cold fuel. Rather, the coolant preheats the entire system, including the fuel, before the vehicle is started. Preheated fuel is sent to the engine which reduces the likelihood that the power fluid, such as diesel fuel, will gel. In addition, the engine and system components are all heated and thawed before start up of the vehicle, which reduces damage and wear on the components.

Battery warmer system 258 in accordance with the invention is advantageous since a warm battery has more starting amperage when the battery is warm rather than cold. This is particularly important in extreme cold temperatures, since the heat exchange from the phase change material 290 to the battery 260 keeps the battery warmer longer during extended vehicle shut down times. In fact, battery warmer system 258 is able to maintain the temperature of the battery 260 at temperatures above the ambient temperature, even when the vehicle has been shut down for several days in extreme cold weather.

The use of bypass components and shut off thermostats is particularly advantageous in the fuel heating system described in the invention. Use of these components in water separator 24, mechanical thermostat 224, and bypass thermostat 274 ensures that the power fluids used within the fuel heating system are kept within optimum operating temperatures.

It is also advantageous to heat other power fluids, such as the oil, which is utilized in the fuel heating system before the start up of the engine. Use of heat exchanger 292 external to the oil pan is particularly advantageous since it reduces the possibility of contamination of the oil by the heatable fluid used in heat exchanger 292. In addition, an external heat exchanger 292 is advantageous since there is less chance of fire caused by an immersible heating element within the oil pan. In addition, heat exchanger 292 may be utilized to provide heat transfer capabilities within the fuel heating system, increasing the temperature of the coolant which enters and passes through engine 28. This is advantageous since heat exchanger 292 aids in heating the fuel heating system more quickly.

It should be understood that the components used in the fuel heating system described in the invention can be configured to accommodate the various needs and applications of the vehicle owner. It has been found to be most advantageous to use all of the above described components in the fuel heating system, but the fuel heating system will work to achieve the significant results discussed above even when all of the components are not used in the fuel heating system. For instance, if either battery warmer system 258 or heat exchanger 292, or both, are not utilized, the fuel heating system described in the invention will work to achieve the significant results discussed above, including reductions in gel waxing and increased engine performance.

We claim:

1. A power fluid heating system for power fluid entering an engine, the power fluid heating system having a container which stores the power fluid, the power fluid heating system comprising:

a) at least one power fluid heating apparatus, comprising:
      i) a first power fluid pickup conduit having an inlet and an outlet, the inlet being insertable into the container to draw power fluid from the container, and the outlet directing power fluid toward the engine;
      ii) at least one second power fluid pickup conduit having an inlet and an outlet, the second power fluid pickup conduit inlet being insertable into the container to draw power fluid from the container, and the second power fluid pickup conduit outlet directing power fluid away from the power fluid heating apparatus; and
      iii) a heat exchanger operatively coupled with the first and second pickup conduits to heat at least the power fluid in the first and second pickup conduits, the heat exchanger including a heat conductive portion insertable into the container, the heat conductive portion containing a heatable fluid;
   b) a water separating device in fluid connection with the power fluid heating apparatus, the after separating device comprising:
      i) a power fluid reservoir having a heatable fluid inlet, a heatable fluid outlet, a power fluid inlet in fluid communication with the first power fluid pickup conduit, a power fluid outlet in fluid communication with the power fluid inlet, and a water outlet; and
      ii) a heat exchanger disposed inside the power fluid reservoir and including at least one tube extending between the heatable fluid inlet and the heatable fluid outlet and an enclosure disposed around at least a portion of the at least one tube to define a pre-heat chamber, the enclosure including a shell portion having first and second ends and a baffle disposed on the first end of the shell portion to define the pre-heat chamber; and c) an auxiliary function apparatus operatively coupled with the power fluid heating apparatus to receive power fluid from the second power fluid pickup conduit and to perform an auxiliary function using the power fluid.

2. The power fluid heating system of claim 1, wherein the water separating device further comprises a heating element disposed inside the power fluid reservoir of the water separating device, the heating element having a power fluid inlet in fluid communication with the at least one second power fluid pickup conduit and a power fluid outlet.

3. The power fluid heating system of claim 1, further comprising bypass means for regulating the temperature of the power fluid by bypassing the flow of the heatable fluid around the power fluid heating apparatus, the bypass means being positioned adjacent the water separating device power fluid reservoir power fluid outlet.

4. The power fluid heating system of claim 1, further comprising warming means for providing heat to a battery used in the power fluid heating system.

5. The power fluid heating system of claim 4, wherein the warming means comprises a heat exchanger and a volume of phase change material adjacent the heat exchanger of the warming means.

6. The power fluid heating system of claim 1, wherein the power fluid is diesel fuel, and the heatable fluid is engine coolant.

7. The power fluid heating system of claim 1, further comprising heat exchanger means, adjacent the engine, for heating a second fluid.

8. The power fluid heating system of claim 7, wherein the second fluid is oil.

9. The power fluid heating system of claim 7, wherein the second fluid is engine coolant.

10. The power fluid heating system of claim 1, wherein the water separating device further comprises a heating element disposed of the power fluid reservoir, the heating element having a power fluid inlet in fluid communication with the second power fluid pickup conduit, and having a power fluid outlet.

11. A heating system for power fluid entering an engine, the heating system comprising:
  a) a container for holding the power fluid;
  b) a power fluid heating apparatus, comprising:
    i) a first power fluid pickup conduit having an inlet and an outlet, the inlet being insertable into the container to draw power fluid from the container, and the outlet directing power fluid toward the engine;
    ii) at least one second power fluid pickup conduit having an inlet and an outlet, the second power fluid pickup conduit inlet being insertable into the container to draw power fluid from the container, and the second power fluid pickup conduit outlet directing power fluid away from the heating apparatus; and
    iii) a heat exchanger assembly for heating at least the power fluid in the first and second power fluid pickup conduits, the heat exchanger assembly including a heat conductive portion insertable into the container, the heat conductive portion containing a heatable fluid; and
  c) an auxiliary function apparatus operatively coupled with the power fluid heating apparatus to receive power fluid from the second power fluid pickup conduit and to perform an auxiliary function using the power fluid.

12. The heating system of claim 11, further comprising warming means located adjacent the auxiliary function apparatus for heating a battery used in the power fluid heating system by heat transfer.

13. The power fluid heating system of claim 4, wherein the heatable fluid is engine coolant.

14. The heating system of claim 11, wherein the auxiliary function apparatus is an auxiliary heater that heats heatable fluid and directs heated heatable fluid from the auxiliary heater to the heat conductive portion of the power fluid heating apparatus.

15. The heating system of claim 11, further comprising a start-up heating apparatus operably coupled with the power fluid heating apparatus to receive and heat power fluid from the second power fluid pickup conduit, the start-up heating apparatus directing the heated power fluid to the auxiliary function apparatus.

16. The heating system of claim 15, further comprising a water separating device in fluid connection with the first and second power fluid pickup conduits, the water separating device separating water contaminants from power fluid received from the first power fluid pickup conduit.

17. The heating system of claim 16, wherein the start-up heating apparatus is disposed within the water separating device.

18. The heating system of claim 11, wherein the second power fluid pickup conduit is disposed within the first power fluid pickup conduit.

19. The heating system of claim 11, wherein the second power fluid pickup conduit is concentric with the first power fluid pickup conduit.

20. The heating system of claim 11, wherein the second power fluid pickup conduit is adjacent to the first power fluid pickup conduit.

21. The heating system of claim 11, wherein the power fluid heating apparatus comprises a solid region, the second power fluid pickup conduit being at least partially disposed within the solid region.

22. The heating system of claim 21, wherein the solid region of the power fluid heating apparatus surrounds the second power fluid pickup conduit.

23. The heating system of claim 11, wherein the auxiliary function apparatus comprises an auxiliary heater operatively coupled with the power fluid heating apparatus to heat heatable fluid and direct heated heatable fluid to the heat conductive portion of the power fluid heating apparatus.

24. A heating system for power fluid entering an engine, comprising:
  a) container for holding the power fluid;
  b) power fluid heating apparatus, comprising:
    i) a first power fluid pickup conduit having an inlet and an outlet, the inlet being insertable into the container to draw power fluid from the container, and the outlet directing power fluid toward the engine;
    ii) at least one second power fluid pickup conduit having an inlet and an outlet, the second power fluid pickup conduit inlet being insertable into the container to draw power fluid from the container, and the second power fluid pickup conduit outlet directing power fluid away from the heating apparatus; and
    iii) a heat exchanger assembly for heating at least the power fluid in the first and second power fluid pickup conduits, the heat exchanger assembly including a heat conductive portion insertable into the container, the heat conductive portion containing a heatable fluid;
  c) a power fluid start-up heater operatively coupled with the power fluid heating apparatus to receive and heat power fluid from the second power fluid pickup conduit; and
  d) an auxiliary function apparatus operatively coupled with the power fluid start-up heater, the auxiliary function apparatus receiving heated power fluid from the power fluid start-up heater.

25. The heating system of claim 4, wherein the power fluid start-up heater comprises an electric heating element.

26. The heating system of claim 4, wherein the power fluid is selected from the group consisting of diesel fuel, petrol, gasoline, kerosene, aviation fuel and hydraulic fluid.

27. The heating system of claim 26, wherein the heatable fluid is engine coolant.

28. The heating system of claim 24, further comprising a water separating device, wherein the power fluid start-up heater is disposed within the water separating device.

29. The heating system of claim 24, wherein the auxiliary function apparatus receives power fluid from the second power fluid pickup conduit via the power fluid start-up heater.

30. The heating system of claim 24, wherein the auxiliary function apparatus is an auxiliary heater.

31. A system for pre-heating power fluid before use in an engine of a vehicle, comprising:
   a) a container for holding the power fluid;
   b) a power fluid heating apparatus, comprising:
      i) a first power fluid pickup conduit having an inlet and an outlet, the inlet being insertable into the container to draw power fluid from the container, and the outlet directing power fluid toward the engine;
      ii) at least one second power fluid pickup conduit having an inlet and an outlet, the second power fluid pickup conduit inlet being insertable into the container to draw power fluid from the container, and the second power fluid pickup conduit outlet directing power fluid away from the heating apparatus; and
      iii) a heat exchanger assembly for heating at least the power fluid in the first and second power fluid pickup conduits, the heat exchanger assembly including a heat conductive portion insertable into the container, the heat conductive portion containing a heatable fluid;
   c) an auxiliary function apparatus operatively coupled with the power fluid heating apparatus to receive power fluid from the second power fluid pickup conduit and to perform an auxiliary function using the power fluid; and
   d) battery warming means in fluid connection with the heat conductive portion of the heat exchanger assembly for heating a battery, the battery warming means comprising:
      i) a housing;
      ii) heat exchanger means for providing a heatable fluid flow, the heat exchanger means being positioned within the housing and having heatable fluid passages for receiving heatable fluid; and
      iii) phase changing material within the housing proximal the heat exchanger means, the heatable fluid providing heat exchange to the phase changing material by passage of the heatable fluid through the heat exchanger means of the battery warming means.

32. The system of claim 31, further comprising:
   battery warming means in fluid connection with the heat exchanger assembly; and
   bypass means for selectively bypassing the heatable fluid from the battery warming means.

33. The system of claim 31, further comprising bypass means positioned proximal the battery warming means for regulating the temperature of the power fluid by selectively bypassing the flow of the heatable fluid from the heat exchanger assembly.

34. The system of claim 33, wherein the power fluid is selected from the group of power fluids consisting of diesel fuel, petrol, gasoline, kerosene, aviation fuel, and hydraulic fluid.

35. The system of claim 33, wherein the heatable fluid is engine coolant.

36. A heating system for fluid used in an engine system having an engine, the heating system having a container which stores the fluid, the heating system comprising:
   a) a heating apparatus, comprising:
      i) a first fluid pickup conduit having an inlet and an outlet, the inlet being insertable into the container to draw fluid from the container, and the outlet directing fluid to the engine;
      ii) at least one second fluid pickup conduit having an inlet and an outlet, the second fuel pickup conduit inlet being insertable into the container to draw fluid from the container, and the second fuel pickup conduit outlet directing fluid away from the heating apparatus;
      iii) first heat exchanger means for heating both the fluid in the container and the fluid in the first and second fluid pickup conduits, the first and second fluid pickup conduits being disposed at least partially within the first heat exchanger means, the first heat exchanger means including a heat conductive portion insertable into the container in contact with the fluid in the container, inlet means for admitting a heatable fluid into the heat conductive portion, and outlet means for discharging the heatable fluid from the heat conductive portion, the heat conductive portion of the heat exchanger means being thermally coupled to the first and second fluid pickup conduits; and
   b) auxiliary heat exchanger means having at least one heatable fluid passage for providing heatable fluid flow through the passage, the auxiliary heat exchanger means receiving fluid from the second fluid pickup conduit to heat the heatable fluid and direct heated heatable fluid to the inlet means of the first heat exchanger means.

37. The heating system of claim 36, further comprising a water separating device in fluid connection with the first and second fluid pickup conduit outlets, the water separating device comprising:
   i) a fluid reservoir having a heatable fluid inlet, a heatable fluid outlet, a fluid inlet, a fluid outlet, and a water outlet; and
   ii) third heat exchanger means disposed inside the fluid reservoir and including at least one tube extending between the heatable fluid inlet and the heatable fluid outlet and an enclosure disposed around at least a portion of the tube to define a pre-heat chamber, the heatable fluid exiting the water separating device providing heat transfer to the heatable fluid in the auxiliary heat exchanger means, and to the container which stores the fluid.

38. The heating system of claim 37, wherein the water separating device further comprises a heating element disposed inside the reservoir adjacent the third heat exchanger means, the heating element having a fluid inlet and a fluid outlet, the fluid inlet being in fluid communication with the second fluid pickup conduit.

39. The heating system of claim 38, further comprising warming means adjacent the auxiliary heat exchanger means for heating a battery used in the heating system.

40. The heating system of claim 39, wherein the warming means comprises a heat exchanger which includes a volume of phase change material.

41. The heating system of claim 40, wherein the fluid is selected from the group consisting of diesel fuel, petrol, gasoline, kerosene, aviation fuel, hydraulic fluid, and engine coolant.

42. A fuel heating system for an engine system having an engine, the fuel heating system having a container which stores fuel, the fuel heating system comprising:
 a) fuel heating means for heating the fuel stored in the container, the fuel heating means comprising:
  i) a first fuel pickup conduit having an inlet and an outlet, the inlet being insertable into the container to draw power fluid from the container, and the outlet directing fuel toward the engine;
  ii) at least one second fuel pickup conduit having an inlet and an outlet, the second fuel pickup conduit inlet being insertable into the container to draw fuel from the container, and the second fuel pickup conduit outlet directing fuel away from the fuel heating means; and
  iii) heat exchanger means for heating at least the fuel in the first and second fuel pickup conduits, the heat exchanger means including a heat conductive portion insertable into the container, inlet means for admitting a heatable fluid into the heat conductive portion, and outlet means for discharging the heatable fluid from the heat conductive portion;
 b) a water separating device adjacent the fuel heating means, the water separating device comprising:
  i) a fuel reservoir having a heatable fluid inlet, a heatable fluid outlet, a fuel inlet, a fuel outlet, and a water outlet;
  ii) a heat exchanger disposed inside the reservoir and including at least one tube extending between the heatable fluid inlet and the heatable fluid outlet and an enclosure disposed around at least a portion of the tube to define a pre-heat chamber, the enclosure including at least a portion of a shell having first and second ends and a baffle disposed on the first end of the shell portion to define the pre-heat chamber, the tube being disposed in the pre-heat chamber; and
  iii) a heating element disposed inside the reservoir adjacent the water separating device heat exchanger, the heating element having a fluid inlet and a fluid outlet, the heating element fluid inlet being in fluid communication with the second fuel pickup conduit;
 c) auxiliary heat exchanger means having heatable fluid passages suitable for providing a heatable fluid flow through the passages, the auxiliary heat exchanger means receiving fuel from the second fuel pickup conduit to heat the heatable fluid, the auxiliary heat exchanger means directing heated heatable fluid to the inlet means of the heat exchanger means; and
 d) battery warming means adjacent the engine for heating a battery, the battery warming means comprising:
  i) a housing;
  ii) heat exchanger means positioned within the housing having heatable fluid passages suitable for providing a heatable fluid flow through the passages; and
  iii) phase changing material means within the housing for heating the battery, the heatable fluid providing heat exchange to the phase changing material means by passage through the heat exchanger means of the battery warming means.

43. The fuel heating system of claim 42, further comprising bypass means for regulating the temperature of the fuel, the bypass means being positioned adjacent the water separating device.

44. The fuel heating system of claim 42, wherein the heatable fluid is engine coolant.

45. A heating system for power fluid entering a prime mover, the heating system comprising:
 a) holding means for holding the power fluid;
 b) power fluid heating means for heating the power fluid, the power fluid heating means comprising:
  i) first power fluid pickup means for drawing power fluid from the holding means and directing power fluid toward the prime mover;
  ii) second power fluid pickup means for drawing power fluid from the holding means and directing power fluid away from the power fluid heating means; and
  iii) heat exchanger means for heating the power fluid in the first and second power fluid pickup means, the heat exchanger means including a heat conductive portion containing a heatable fluid; and
 c) means for performing an auxiliary function, the means for performing an auxiliary function being operatively coupled with the power fluid heating means to receive power fluid from the second power fluid pickup means and to perform an auxiliary function using the power fluid.

46. The heating system of claim 45, further comprising start-up heating means for heating the power fluid at start-up of the heating system and for directing heated power fluid to the means for performing an auxiliary function, the start-up heating means being operably coupled with the power fluid heating means to receive power fluid from the second power fluid pickup means and to heat the power fluid.

47. The heating system of claim 45, wherein the means for performing an auxiliary function is an auxiliary heating means for heating a heatable fluid.

48. The heating system of claim 47, wherein the auxiliary heating means is operatively coupled with the heat conductive portion of the heat exchanger means to direct heated heatable fluid from the auxiliary heating means to the heat conductive portion of the heat exchanger means.

49. The heating system of claim 45, wherein the prime mover is an engine operably coupled with the power fluid heating means to receive power fluid from the second power fluid pickup means.

50. The heating system of claim 45, further comprising water separating means for separating water contaminants from power fluid received from the first power fluid pickup means, the water separating means being in fluid communication with the first power fluid pickup means and the second power fluid pickup means.

51. The heating system of claim 50, further comprising start-up heating means, disposed within the water separating means, for heating power fluid at start-up of the heating system and directing heated power fluid to the means for performing an auxiliary function, the start-up heating means being operably coupled with the power fluid heating means to receive power fluid from the second power fluid pickup means and to heat the power fluid.

52. The heating system of claim 45, wherein the second power fluid pickup means is disposed within the first power fluid pickup means.

53. The heating system of claim 45, wherein the first power fluid pickup means surrounds the second power fluid pickup means.

54. The heating system of claim 45, wherein the power fluid heating means comprises a solid region, the second power fluid pickup means being at least partially disposed within the solid region.

* * * * *